United States Patent
Morse et al.

(10) Patent No.: US 6,964,740 B2
(45) Date of Patent: Nov. 15, 2005

(54) SYSTEM AND METHOD OF GAS ENERGY MANAGEMENT FOR PARTICLE FLOTATION AND SEPARATION

(75) Inventors: Dwain E. Morse, 2655 Montrose Pl., Santa Barbara, CA (US) 93105-2142; Wade O. Morse, Santa Barbara, CA (US); Thomas G. Matherly, Lompoc, CA (US)

(73) Assignees: Dwain E. Morse, Santa Barbara, CA (US); Jerry Friedman, Inglewood, CA (US)

( * ) Notice: Subject to any disclaimer, the term of this patent is extended or adjusted under 35 U.S.C. 154(b) by 1 day.

(21) Appl. No.: 10/810,295

(22) Filed: Mar. 25, 2004

(65) Prior Publication Data

US 2004/0178152 A1 Sep. 16, 2004

Related U.S. Application Data

(63) Continuation-in-part of application No. 10/270,995, filed on Oct. 14, 2002, now Pat. No. 6,797,181, which is a continuation-in-part of application No. 10/180,216, filed on Jun. 25, 2002.

(60) Provisional application No. 60/458,548, filed on Mar. 27, 2003.

(51) Int. Cl.[7] ............................. C02F 1/24; C02F 9/00; C02F 9/02

(52) U.S. Cl. .................. 210/221.2; 210/205; 210/206; 210/90; 210/295; 261/79.2

(58) Field of Search ............................... 210/205, 206, 210/221.1, 221.2, 90, 295; 366/165.1, 165.4; 261/79.2

(56) References Cited

U.S. PATENT DOCUMENTS

| | | | | |
|---|---|---|---|---|
| 2,220,574 A | * | 11/1940 | Little et al. | 210/205 |
| 2,360,811 A | * | 10/1944 | Kelly et al. | |
| 2,746,605 A | * | 5/1956 | Baum | 210/137 |
| 2,779,731 A | * | 1/1957 | Kelly et al. | 210/519 |
| 2,876,863 A | * | 3/1959 | Kivari | 95/246 |
| 3,179,252 A | * | 4/1965 | Vrablik | 210/120 |
| 3,446,488 A | * | 5/1969 | Mail et al. | 261/77 |
| 3,542,675 A | * | 11/1970 | Kennett et al. | 210/703 |
| 3,917,526 A | * | 11/1975 | Jenning | |
| 3,977,970 A | * | 8/1976 | Willis et al. | 210/703 |
| 3,986,954 A | * | 10/1976 | George et al. | 210/706 |
| 4,022,696 A | | 5/1977 | Krofta | |
| 4,067,813 A | * | 1/1978 | Pielkenrood | |
| 4,193,869 A | * | 3/1980 | Brucker et al. | 210/705 |

(Continued)

FOREIGN PATENT DOCUMENTS

JP 07-303882 A * 11/1995

(Continued)

*Primary Examiner*—Thomas M. Lithgow
(74) *Attorney, Agent, or Firm*—Kelly, Lowry & Kelley, LLP

(57) ABSTRACT

A system for separating particles from a contaminated liquid stream includes an apparatus for mixing the liquid with one or more separation enhancement additives and gases. A pressure reducing device having a flow restrictor element within an enlarged tube receives the mixed liquid and creates bubble laden floccs by reducing the pressure of the liquid stream. The pressure reducing device empties into a bloom chamber of a flotation tank, where the bubble laden floccs are directed upwardly to an upper portion of the flotation tank. The flotation tank is configured such that the bubble laden floccs circulate within the upper portion of the flotation tank until they float to the upper surface, while decontaminated liquid flows to a lower portion of the tank for removal. A skimmer removes the floated contaminated floccs from the upper surface of the flotation tank into a dewatering apparatus.

22 Claims, 16 Drawing Sheets

U.S. PATENT DOCUMENTS

| | | |
|---|---|---|
| 4,279,743 A | 7/1981 | Miller |
| 4,339,027 A | 7/1982 | Lauer |
| 4,340,487 A * | 7/1982 | Lyon .................... 210/705 |
| 4,377,485 A * | 3/1983 | Krofta |
| 4,397,741 A | 8/1983 | Miller |
| 4,744,890 A | 5/1988 | Miller et al. |
| 4,838,434 A | 6/1989 | Miller et al. |
| 4,997,549 A | 3/1991 | Atwood |
| 5,120,435 A * | 6/1992 | Fink |
| 5,139,663 A | 8/1992 | Maples |
| 5,151,177 A | 9/1992 | Roshanravan et al. |
| 5,160,610 A | 11/1992 | O'Reilly |
| 5,160,611 A * | 11/1992 | Krofta |
| 5,199,684 A | 4/1993 | Maples |
| 5,224,604 A | 7/1993 | Duczmal et al. |
| 5,275,732 A | 1/1994 | Wang et al. |
| 5,382,358 A | 1/1995 | Yeh |
| 5,492,630 A | 2/1996 | Roshanravan et al. |
| 5,514,282 A * | 5/1996 | Hibbard et al. |
| 5,516,433 A * | 5/1996 | Suutarinen .................. 210/703 |
| 5,529,190 A | 6/1996 | Carlton et al. |
| 5,529,701 A * | 6/1996 | Grisham et al. |
| 5,531,904 A * | 7/1996 | Grisham et al. |
| 5,538,631 A | 7/1996 | Yeh |
| 5,591,348 A * | 1/1997 | Felder et al. |
| 5,662,790 A * | 9/1997 | Carlton et al. |
| 6,106,711 A | 8/2000 | Morse et al. |
| 6,171,488 B1 | 1/2001 | Morse et al. |

FOREIGN PATENT DOCUMENTS

| | | |
|---|---|---|
| JP | 08-132020 A * | 5/1996 |
| RU | 798048 * | 1/1979 |
| SU | 1555293 A1 | 4/1990 |
| WO | WO 94/17920 | 8/1994 |
| WO | WO 96/12678 | 5/1996 |
| WO | 99/11352 A1 * | 3/1999 |
| WO | 01/51164 A1 * | 7/2001 |

* cited by examiner in 64ths

| # of Holes | Hrtz | GPM | P1 | P2 | Delta P | 2 Foot Vis | Python Size |
|---|---|---|---|---|---|---|---|
| 7 | 46 | 10 | 54 | 33 | 21 | 4.000 | 20 |
| 7 | 48 | 10 | 57 | 36 | 21 | 3.250 | 19 |
| 7 | 50 | 10 | 62 | 43 | 19 | 1.500 | 18 |
| 7 | 51 | 10 | 68 | 47 | 21 | 1.750 | 17 |
| 7 | 56 | 10 | 82 | 63 | 19 | 2.000 | G |
| 7 | 58 | 10 | 90 | 70 | 20 | 1.750 | 16 |
| 7 | | | | | | | 15 |
| 7 | | | | | | | 14 |

FIG. 16A in 64ths

| # of Holes | Hrtz | GPM | P1 | P2 | Delta P | 2 Foot Vis | Python Size |
|---|---|---|---|---|---|---|---|
| 20 | 40 | 10 | 38 | 32 | 6 | 6.000 | 20 |
| 20 | 41 | 10 | 40 | 36 | 4 | 4.000 | 19 |
| 20 | 45 | 10 | 50 | 45 | 5 | 3.500 | 18 |
| 20 | 46 | 10 | 51 | 46 | 5 | 2.750 | 17 |
| 20 | 52 | 10 | 70 | 66 | 4 | 3.250 | G |
| 20 | 54 | 10 | 76 | 70 | 6 | 2.750 | 16 |
| 20 | 56 | 10 | 83 | 78 | 5 | 3.500 | 15 |
| 20 | 60 | 10 | 96 | 91 | 5 | 7.000 | 14 |

FIG. 16B in 64ths

| # of Holes | Hrtz | GPM | P1 | P2 | Delta P | 2 Foot Vis | Python Size |
|---|---|---|---|---|---|---|---|
| 28 | 40 | 10 | 38 | 36 | 2 | 5.000 | 20 |
| 28 | 42 | 10 | 43 | 39 | 4 | 3.500 | 19 |
| 28 | 44 | 10 | 48 | 45 | 3 | 3.500 | 18 |
| 28 | 46 | 10.2 | 52 | 48 | 4 | 3.000 | 17 |
| 28 | 48 | 9.5 | 59 | 55 | 4 | 2.500 | G |
| 28 | 51 | 9.7 | 68 | 64 | 4 | 2.750 | 16 |
| 28 | 54 | 10 | 76 | 72 | 4 | 3.500 | 15 |
| 28 | 60 | 10 | 95 | 92 | 3 | 3.500 | 14 |

FIG. 16C

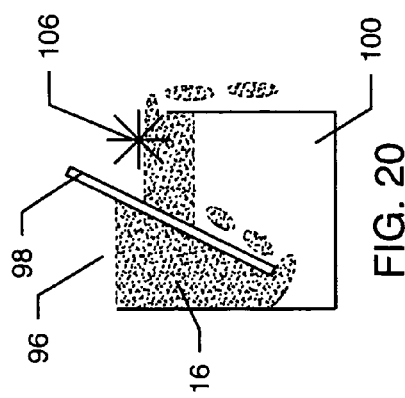
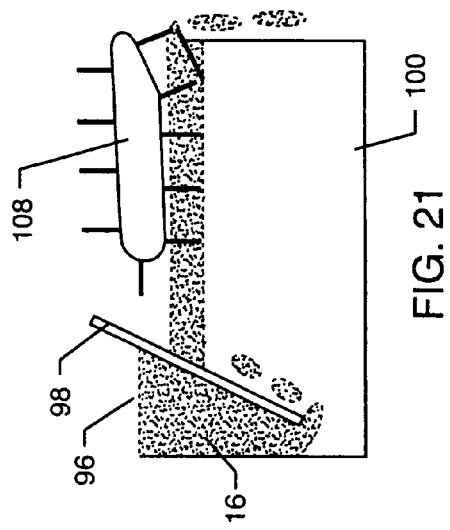
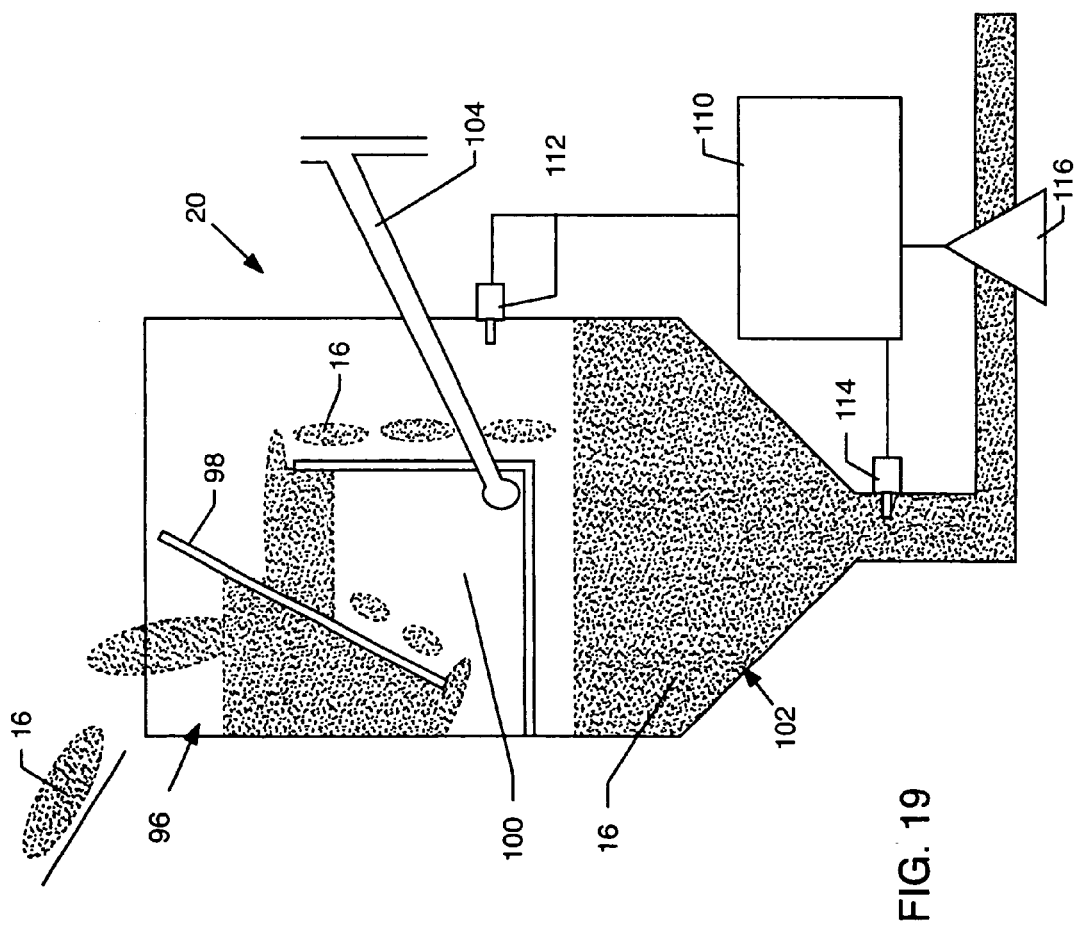

US 6,964,740 B2

SYSTEM AND METHOD OF GAS ENERGY MANAGEMENT FOR PARTICLE FLOTATION AND SEPARATION

RELATED APPLICATION

This application claims priority to U.S. Provisional Patent Application Ser. No. 60/458,548, filed on Mar. 27, 2003; and is a continuation-in-part application of U.S. patent application Ser. No. 10/270,995, filed Oct. 14, 2002 now U.S. Pat. No. 6,797,181; and a continuation-in-part application of U.S. patent application Ser. No. 10/180,216, filed Jun. 25, 2002.

BACKGROUND OF THE INVENTION

The present invention generally relates to liquid separation components, systems and methods. More particularly, the present invention relates to a liquid flotation separation system, which occupies a much smaller footprint and can be adjusted to accommodate the changing liquid stream.

It is often necessary to remove contaminants from liquid. For example, the need to remove particles, colloids, solvent and oil from wastewater is desirable in many settings.

Most wastewater solid and emulsified components such as soil particles, fats, oils and grease are charged. Wastewater processing/treatment chemicals or additives such as coagulants and flocculents are added to neutralize this charge and initiate nucleation and growth of larger colloidal and suspended particles, also referred to as floccs. Floccs can arrange in size from a millimeter to centimeters in diameter when coagulation and flocculation processes are optimized. Too much chemical will recharge floccs and result in their break-up and/or permanent destruction as overcharged particles or floccs repel each other and tend to stay apart.

Coagulants are chemicals used to neutralize particle charge such as inorganic salts (e.g. ferric chloride) or polymers (e.g. cationic polyamides). Flocculants are large molecular weight polymers used to collect the smaller coagulated floccs into large stable floccs, facilitating solid/liquid separation. These large molecules are often coiled and have to be uncoiled plus mixed well with the incoming coagulated wastewater stream.

Coagulants are often viscous chemicals, requiring adequate mixing time and energy to mix them homogeneously with the incoming wastewater stream. Similarly, an optimum mixing energy is required for the flocculants to be uncoiled and mixed well with the incoming coagulated wastewater stream. If the polymer strands are wound or "globbed" together, the polymer can only attach a minimal amount of waste particles. If mixing is not optimized, an excessive amount of coagulant or flocculant polymer may be introduced into the contaminated liquid in an attempt to coagulate to the greatest extent possible, thus wasting valuable and expensive coagulant and polymer chemicals. However, if too much mixing energy is applied, irreversible break-up of the floccs and inefficient solid/liquid separation occurs.

Dissolved air flotation (DAF) systems are often used to separate particulate material from liquids, such as wastewater. These systems typically employ the principle that bubbles rising through a liquid attach to and carry away particles suspended in the liquid. As bubbles reach the liquid surface, the attached particles coalesce to form a froth that is collected.

It is preferred that the contaminated liquid and treatment additives form a homogenous mixture such that when the dissolved gas is added and subsequently allowed to coalesce into bubbles, a good majority of the contaminants will be taken into the surface with the bubbles. If the mixture is not homogenous, an unacceptable amount of contaminants will remain in the liquid even after treatment.

In the past, it was believed that vigorous mixing over a prolonged period of time provided optimal mixing. However, the inventors have found that this is not the case. Instead, the inventors have discovered that certain treatment additives are very sensitive to the mixing energy used. Thus, over mixing, as well as under mixing, can have deleterious effects on the additives and may alter their behavior or efficiency. The inventors have also found that mixing time for various treatment additives vary according to the mixing energy used. To effectively use coagulants and flocculants, the inventors have found that mixing time and energy must be matched with pressurization and depressurization energy to create bubbles that are the right size to attach to the floccs and create bubbles that grow into larger bubbles after attaching to the floccs. This ensures the flotation of the flocc clusters out of the water and replacement of much of the entrained water in the flocc cluster with air.

Traditional DAF systems select a fraction of the process exit stream and re-saturate this stream with dissolved gas, typically atmospheric air. This fractional stream is discharged into the lower portion of the flotation tank and the dissolved bubbles rise through the liquid and attach to the contaminant particles in the liquid. The probability of attachment is a function of the number of bubbles formed, the bubble sizes, the collision angle, and the presence of hydrophobic attraction of the bubble to the particle. The tank includes an outlet through which treated liquid passes at a flow rate consistent with the inlet rate of the liquid plus the fraction of discharge circulated for air entrapment.

DAF system processing time and contaminant removal efficiency typically depend on the residence time of the bubbles in the solution and the probability of bubble/particle contact. The residence time, in turn, is affected by bubble size, bubble buoyancy, the depth at which the bubbles are released in the flotation tank, and the amount of turbulence in the liquid. Relatively large footprints are necessary to allow the bubbles sufficient time to rise from the bottom of the tank and reach the liquid surface. As a result, traditional DAF systems employ relatively large and costly tanks having correspondingly large "footprints".

The very size of such systems increases the period of time between control adjustment and effect. This is because water going by the adjustment point, for example a polymer inlet upstream of the DAF, requires over half an hour, and often over an hour, to reach the outlet of the DAF. Thus, there is a substantial delay (i.e. response time) before the effect of the adjustment can be ascertained so as to inform the next adjustment. Thus, these systems lack real-time or even near real-time control. In the event the processing produces a treated effluent stream that is outside operating requirements, the long response time results in production of many gallons of out-of-specification wastewater.

This is especially true under circumstances in which the DAF unit receives flows from several dissimilar processes. This is a common occurrence. Many times the separate flows make up varying fractions of the total flow entering the DAF unit. Floor drains from a canning floor, for example, may carry a fairly small quantity of drained liquid most of the time and large flows during wash downs. Thus, the character of the composite flow that reaches the DAF can commonly change from one minute to the next. Unless adjustments are made to the DAF process, usually via adjustments of chemical dosages, the contaminant removal efficiency will vary and may degrade below requirements. A need exists for the ability to make real time or near real time adjustments that respond to shifts in the character of the streams to be treated. The large tank size of the typical DAF tank is counter-productive to making these real time adjustments.

In an effort to reduce the tank size for a DAF system, one proposal disclosed in U.S. Pat. No. 4,022,696 employs a rotating carriage and floc scoop. The carriage directs an inlet solution substantially horizontally along a flow path to increase the path length for bubble travel, and correspondingly increasing the residence time. However, the rotating carriage and scoop create turbulence that slows bubble rise. Unfortunately, while the tank size reduction is set forth as an advantage, the problem with performance tied to residence time still remains.

Another proposal, disclosed in U.S. Pat. No. 5,538,631, seeks to address the turbulence problem by incorporating a plurality of spaced apart and vertically arrayed baffles. The baffles include respective vanes angularly disposed to re-direct the flow of liquid from an inlet positioned at the bottom of the tank. Liquid flowing through the tank deflects upwardly as it traverses the vanes, purportedly reducing the extensity and intensity of turbulence generated near the inlet to the tank. While this proposal purports to reduce the turbulence problem relating to bubble residence time, the redirected fluid still appears to affect bubbles rising in other areas of the tank, and influences the residence time of such bubbles. Moreover, the proposal fails to address the basic problem of DAF performance being dependent on the need to accomplish bubble-to-particle-adhesion during bubble rise. This increases the residence time needed to complete separation.

In an effort to overcome the limitations in conventional DAF systems, air-sparged hydrocyclones (ASH) have been proposed as a substitute for DAF systems. One form of air-sparged hydrocyclone is disclosed by Miller in U.S. Pat. No. 4,279,743. The device typically utilizes a combination of centrifugal force and air sparging to remove particles from a fluid stream. The stream is fed under pressure into a cylindrical chamber having an inlet configured to direct the fluid stream into a generally spiral path along a porous wall. The angular momentum of the fluid generates a radially directed centrifugal force related to the fluid velocity and indirectly with the radius of the circular path. The porous wall is contained within a gas plenum having gas pressurized to permeate the porous wall and overcome the opposing centrifugal force acting on the fluid. In operation, the unit receives and discharges the rapidly circulating solution while the air permeates through the porous wall. Air passing through the walls of the porous tube are sheared into the fluid stream by the rapidly moving fluid flow. Micro-bubbles formed from the shearing action combine with the particles or gases in the solution and float them toward the center of the cylinder as a froth in a vortex. The centrally located froth vortex is then captured and exited through a vortex finder disposed at the upper end of the cylinder while the remaining solution exits the bottom of the cylinder.

In operation, however, a substantial portion of the froth tends to become re-entrained in the liquid leaving the bottom of the hydrocyclone instead of exiting the top. In addition, froth exiting the top usually has a substantial fraction of water that must then be subjected to lengthy dewatering for decanting back into the process upstream of the hydrocyclone.

One variation in the general ASH construction, as described in U.S. Pat. Nos. 4,838,434 and 4,997,549, includes employing a froth pedestal at the bottom of the cylinder to assist directing the froth vortex through the vortex finder. Another ASH modification includes replacing the vortex finder and froth pedestal with a fixed splitter disposed at the bottom of the cylinder and having a cylindrical knife edge. The edge is positioned to split the helically flowing solution into components dependent upon the specific gravity of the components. As above, the ASH systems tend to suffer from relatively large amounts of solution typically remaining in the froth, and significant particle concentrations often remaining in the solution. In practice, as the particle size of the contaminant becomes smaller, the resulting vector force of the axial and radial velocity dominates the positioning of the particle in the liquid stream. This reduces the effectiveness of the hydrocyclone separator to the point where the smaller particles become randomly distributed in the solution independent of specific gravity.

Morse, et al. disclose in U.S. Pat. No. 6,106,711 a system using a hydrocyclone that differs from the above by the absence of a froth pedestal and vortex finder and by the fact that both the froth and the liquid exit the hydrocyclone together. In addition, the system relies on a downstream tank with vanes that are slanted from the vertical so as to separate the bubble-particle aggregates from the mass of the liquid stream. Morse, et al. also disclose in U.S. Pat. No. 6,171,488 a system using a hydrocyclone that differs from U.S. Pat. No. 6,106,711 in that the hydrocyclone makes a submerged entry into the downstream tank. Although for both of these patents the assembly is small compared to DAF systems, and so provides for near-real-time control, the assembly is a single unit that requires a sizeable location and is large enough to require special equipment to move. It also cannot accommodate the sequential introduction of more than one additive that must be thoroughly mixed with the stream before the introduction of the next additive. For example, it is desirable to adjust pH before adding polymeric flocculants so that high doses of the latter are avoided. In addition, a higher number of extremely fine bubbles would improve flotation. For these Morse inventions, there are not many variables that can be adjusted to optimize performance, so the system often must be customized at the time of manufacturing to the specific waste stream to be treated.

Current technologies are not satisfactory in their ability to respond fast to a changing wastewater influent. The mixing of chemical additives is often physically destructive. They are often not efficient and generally require a long time, causing the real life systems to be large and take up valuable real estate inside the manufacturing facilities.

Therefore, the prior art has not solved the essential problems of large footprints, process control, modular design, homogenous mixing of contaminants, additives and air, or the flexibility to treat the smallest to the largest flows with off the shelf components, or the ability to tune these components on site. A continuing need exists for a flotation separation system with components that need not be near one another so that space constraints can be accommodated. The need also exists for a method of simply and economically creating large quantities of the optimal size bubble needed at each step of the flocculation and flotation process. The need further exists to be able to easily vary the types and order of additives to minimize doses and interface with downstream additives. An additional need exists for a separation system that reduces the quantity of additives needed per unit volume of liquid to be treated. The need exists to control the number, size, and timing of the bubble's formation creating long-range hydrophobic forces acting between the contaminant particles and bubbles, all of which would increase the effectiveness of the system and reduce the operating cost. The flotation separation system and method of the present invention satisfies these needs and provides other related advantages.

SUMMARY OF THE INVENTION

The fluid conditioning system and method of the present invention provides an efficient and cost-effective way of treating liquids. It creates a system to bench test and develop gas liquid and solid mixing strategies, and then implement through a modularized system on any scale, a system that is tuned to homogeneously mix the additives into the liquid without physically degrading the aggregates, organize the bubbles (size, quantity, flotation time, recycle paths) for effective bubble/particle attachment, effectively position the resulting floccule, and accelerate the drainage of the water from these floccules.

This is accomplished in part by minimizing bubble residence time as a factor in flotation system performance. Further, system performance is enhanced by maximizing particle-bubble contact, in part by increasing the number of bubbles of sizes most effective at each step of flocculation and separation. Reduction of the need for residence time allows for smaller flotation containers, which in turn reduces floor space and material construction costs. In addition, near real-time process control can be achieved when there is essentially no residence time (and hence response time) between process adjustments. Substantial space flexibility is also achieved through a unique design that allows the components to be physically remote from one another. Substantial reduction in the amount of high cost additives is obtained by homogenous mixing, sequencing the mixing processes and, depending on the contaminants in the water, customizing the mixing energy and the time duration that the aggregate is exposed to the mixing energy.

To realize the advantages above, the invention comprises a system, and related method, for separating particles from a contaminated liquid stream by flotation. The contaminated liquid is first screened for objects with any dimension greater than the smallest dimension of any aperture in any component of the invention. The contaminated liquid stream then has the necessary separation enhancement additives chemicals added thereto and is pumped to an apparatus for mixing the liquid with the additive chemicals and a gas. In a particularly preferred embodiment, the mixing apparatus comprises a reactor head having a gas injection port and a plurality of liquid ports which are configured to impart a spinning or spiral motion to the liquid as it passes to a downtube of the mixing apparatus. The liquid ports are configured to removably receive liquid flow restrictors, allowing the velocity and volume of the liquid passing through the mixing apparatus to be altered.

The mixed contaminated liquid stream then passes to a pressure reducing device which is in fluid communication with an outlet of the mixing apparatus. A pressure sensor is operably disposed between the mixing apparatus and the pressure reducing device, and an adjustable valve disposed between the mixing apparatus and pressure reducing device is used to alter the flow of liquid to the pressure reducing device.

The pressure reducing device creates bubble laden floccs in the liquid. In a particularly preferred embodiment, the pressure reducing device comprises an enlarged tube having a flow restrictor element therein. Typically, the flow restrictor element comprises an aperture plate, the size and number of the apertures being selected according to a predetermination of characteristics of the contaminated liquid to maximize bubble creation and flotation.

An outlet of the pressure reducing device is disposed within a bloom chamber of a flotation tank, wherein the bubble laden floccs are directed upwardly within the bloom chamber to an upper portion of the flotation tank. The bubble laden floccs which do not immediately float to the surface are circulated within an upper portion of a separation chamber of the flotation tank until they rise to the upper surface of the flotation tank and fluid. An adjustable wall disposed between the bloom chamber and the separation chamber of the flotation tank is used to alter the volume of the flotation tank and the circulation characteristics of the liquid.

The decontaminated liquid flows to a lower portion of the separation chamber of the flotation tank. Preferably, an apertured wall is disposed within the separation chamber of the flotation tank above a floor thereof to assist in a more uniform removal of the decontaminated liquid. A decontaminated liquid chamber is in fluid communication with the lower portion of the flotation tank and a decontaminated liquid outlet. The decontaminated liquid chamber includes an adjustable wall for selectively controlling the volume of decontaminated liquid removed through the outlet.

A mechanism, such as a skimmer, removes the floated contaminant floccs from the upper surface of the flotation tank into a dewatering apparatus, which dewaters the removed contaminated floccs.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIGS. 16A–16C are graphs depicting the determination of optimal parameters of the present invention;

FIG. 19 is a diagrammatic view of a solids dewatering system used in accordance with the present invention;

FIG. 20 is a diagrammatic view illustrating the use of a paddle wheel in such dewatering system; and FIG. 21 is a diagrammatic view illustrating the use of a skimmer device in the dewatering system of the present invention.

DETAILED DESCRIPTION OF THE PREFERRED EMBODIMENTS

Figure 1:
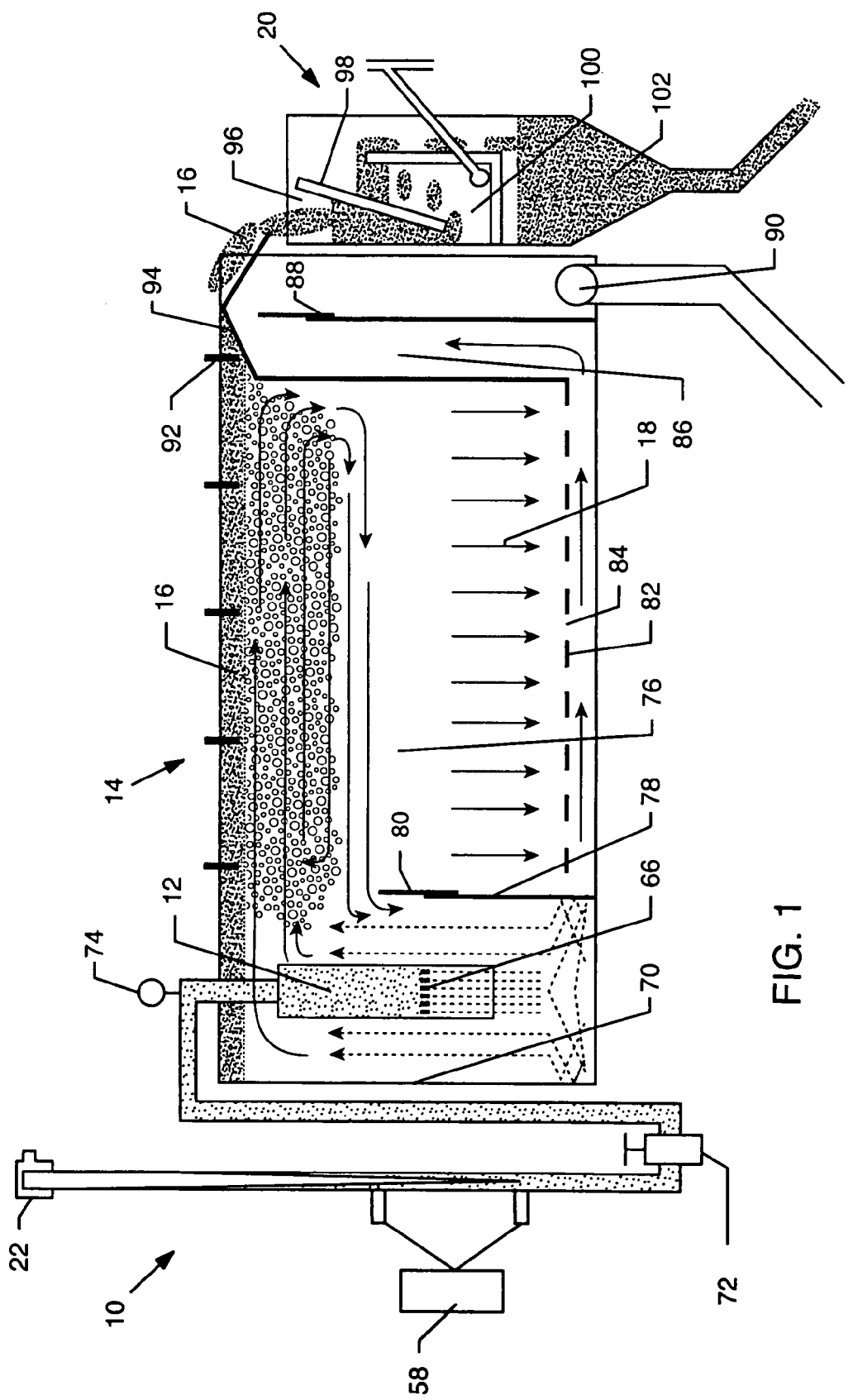
FIG. 1 is a schematic diagram of a flotation liquid decontamination system embodying the present invention.

As shown in the accompanying drawings for purposes of illustration, the present invention resides in an efficient and cost-effective system for treating liquids. The system is shown in FIG. 1 and includes a mixing apparatus 10 fluidly coupled to a depressurizing device 12 which is disposed within a flotation tank 14. The mixing apparatus 10, as will be more fully described herein, is particularly designed to mix chemical additives, gas, and the like to the contaminated liquid such that the gas is entrained in the liquid at a very small size so as to adhere onto solid particles and flocculants such that as the liquid passes through the depressurizing device 12, the bubbles enlarge in size, raising the floccs and solid contaminants towards the surface of the flotation tank 14. Eventually, the floated particles form a sludge or froth 16, while the decontaminated liquid 18 sinks towards the bottom of the flotation tank 14. The froth 16 is removed to a dewatering subsystem or apparatus 20 where the froth 16 is further dewatered and disposed of.

The fluid conditioning of the present invention is designed so as to be modularized on any scale that is tuned to homogeneously mix the additives into the liquid without physically degrading the aggregates, organize the bubbles (size, quantity, flotation time, recycle paths) for effective bubble/particle attachment, effectively positioning the resulting floccule and accelerate the drainage of the decontaminated liquid or water from these floccule. As will be more fully appreciated herein, the present invention dramatically reduces the bubble residence time as a factor in flotation system performance, allowing for smaller flotation tanks 14, which in turn reduces floor space and material construction costs. As will be more fully explained herein, due to the adjustable nature of the component parts of the system as well as the minimum bubble residence time, near real-time process control can be achieved as process adjustments can be made to treat the altering contaminated liquid stream. Space and flexibility is also achieved as the components of the system can be physically remote from one another.

Figure 2:
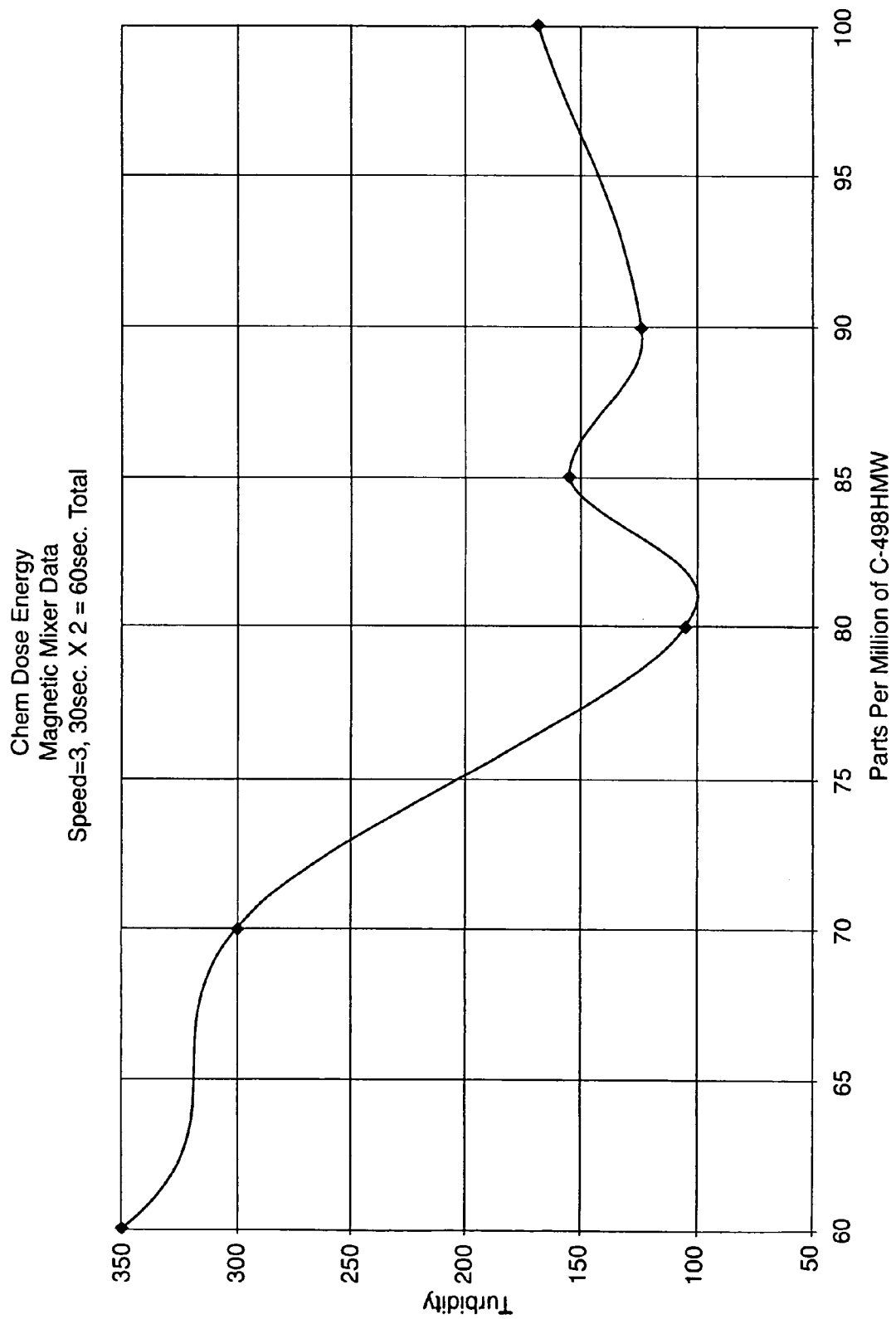
FIG. 2 is a graph illustrating the use of a bench test to determine optimum levels of chemical additives to be used in treating the liquid.
Figure 3:
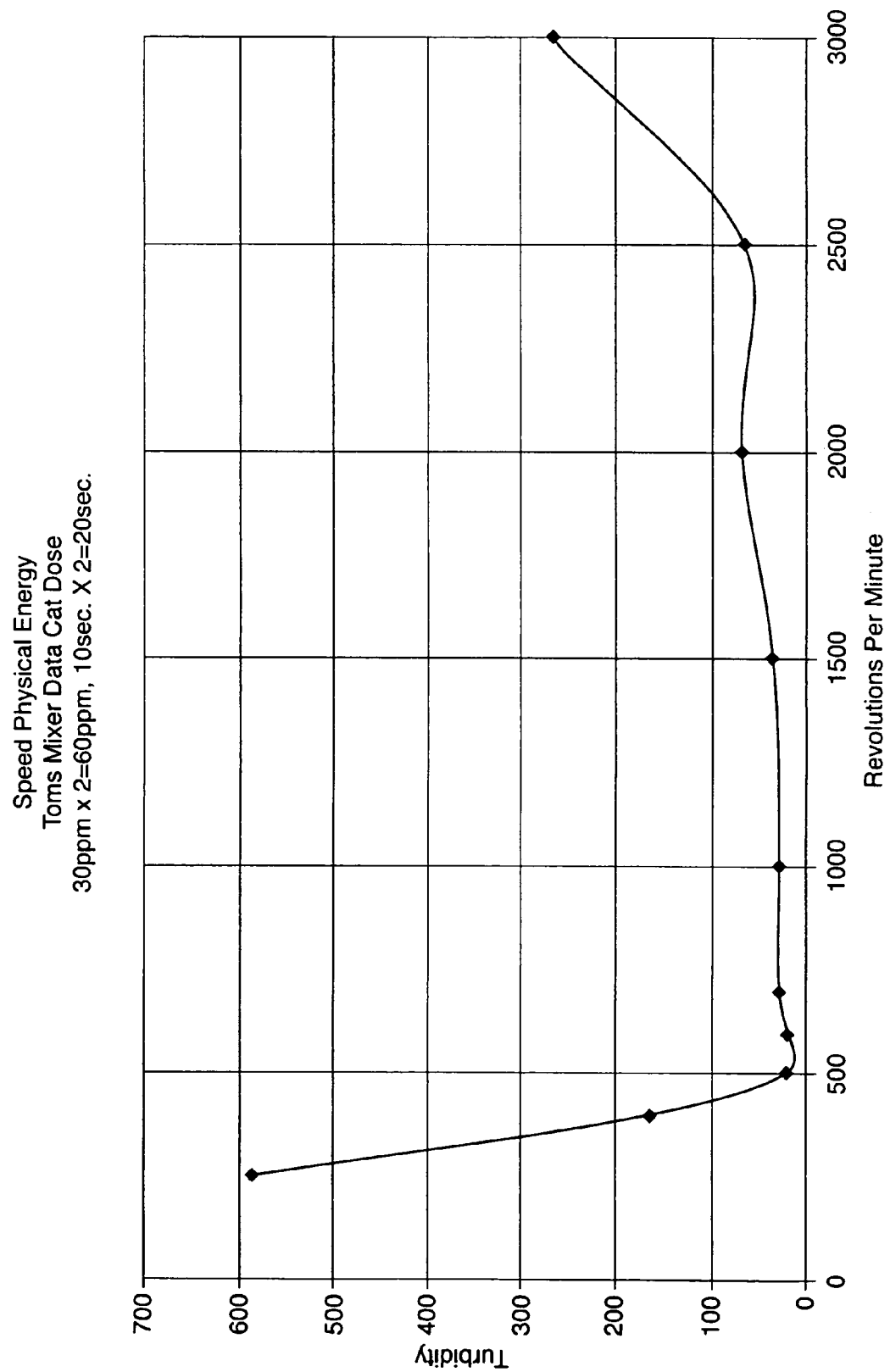
FIG. 3 is a graph depicting the determination of an optimal mixing energy or speed in treating the liquid.
Figure 4:
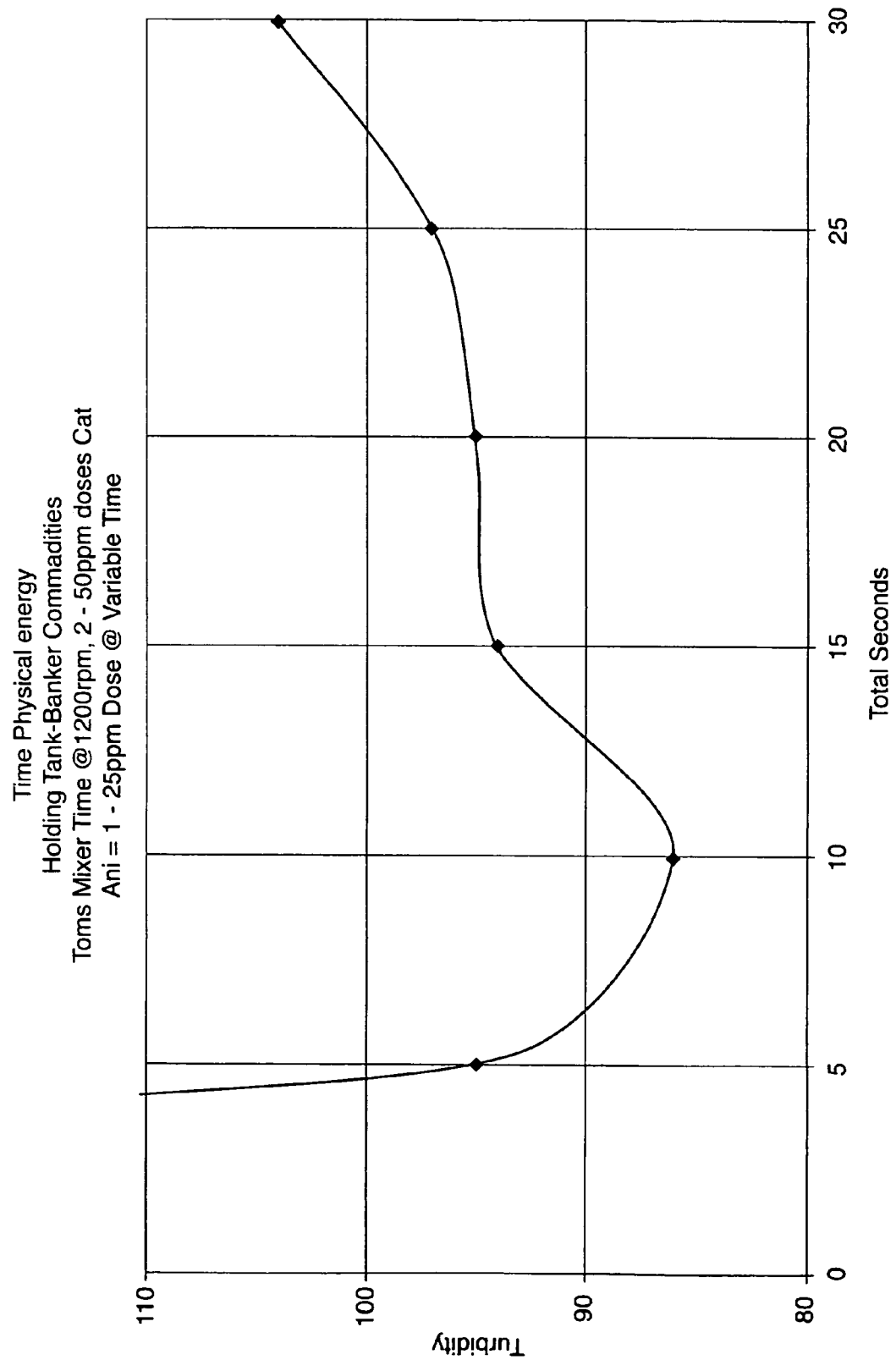
FIG. 4 is a graph depicting the determination of an optimal mixing time in treating the liquid.

With reference now to FIGS. 2–4, in order to design the system of the present invention, a sample of the contaminated liquid is taken from the potential end user. Typically, a few quarts or a few gallons of the liquid is necessary to accomplish the jar or bench testing. As is well-known in the art, portions of the liquid are analyzed to determine its pH, suspended particle characteristics, etc. It is then determined what chemical additives are necessary to alter the pH, coagulate the particles, and create the necessary flocculants. FIG. 2 is a graph depicting a jar test with a magnetic mixer wherein a chemical additive is increasingly added and turbidity measured to determine the optimum amount of chemical additive, 80 parts per million, for the particular contaminated stream.

As discussed above, it is conventional theory that a slower mixing energy over a prolonged period of time results in optimum mixing. However, as illustrated in FIGS. 3 and 4, the inventors have discovered that this is not the case. Instead, there is an optimum mixing speed, or range of speeds, as well as an optimal mixing time for a given contaminated liquid stream. Less mixing energy does not fully mix the additives and gas within the contaminated stream to reduce turbidity while excessive mixing energy can actually destroy the flocculants, as discussed above. Likewise, there has been found to be a "sweet spot" in the amount of time that the particular mixing energy is applied to optimize the reduction in turbidity for given chemical additives. Based upon the determinations in the bench or jar test, the individual components of the system of the present invention are designed and later fine tuned.

When treating the contaminated liquid, it is first screened for objects of any dimension greater than the smallest dimension of any aperture of any component of the invention. The contaminated liquid stream has the necessary separation enhancement additive chemicals added thereto either upstream of the mixing apparatus 10 or within the mixing apparatus 10. In any event, the contaminated liquid is pumped at a predetermined pressure to the mixing apparatus 10.

With reference now to FIGS. 5–8, the liquid solid gas mixing apparatus 10 of the present invention is similar to a hydrocyclone, but unlike a conventional single port hydrocyclone, the apparatus 10 of the present invention has a two-stage delivery mechanism, as will be described more fully herein. The mixing apparatus 10 is comprised of an upper reactor head 22 and a lower down tube 24 through which the mixed liquid exits at an outlet 26 thereof. The mixing apparatus is designed such that the reactor head 22 imparts a spinning motion to the contaminated liquid 28 such that a vortex is formed in the down tube 24, causing the additives, liquid, contaminants, and any entrained gas to mix thoroughly and typically substantially homogeneously.

The reactor head 22 includes a liquid contaminant inlet 30 formed in a side wall or plenum 32 thereof. A base 34 and a lid 36 create an enclosure. A cartridge 38 is disposed within the enclosure of the reactor head 22.

Figure 5:
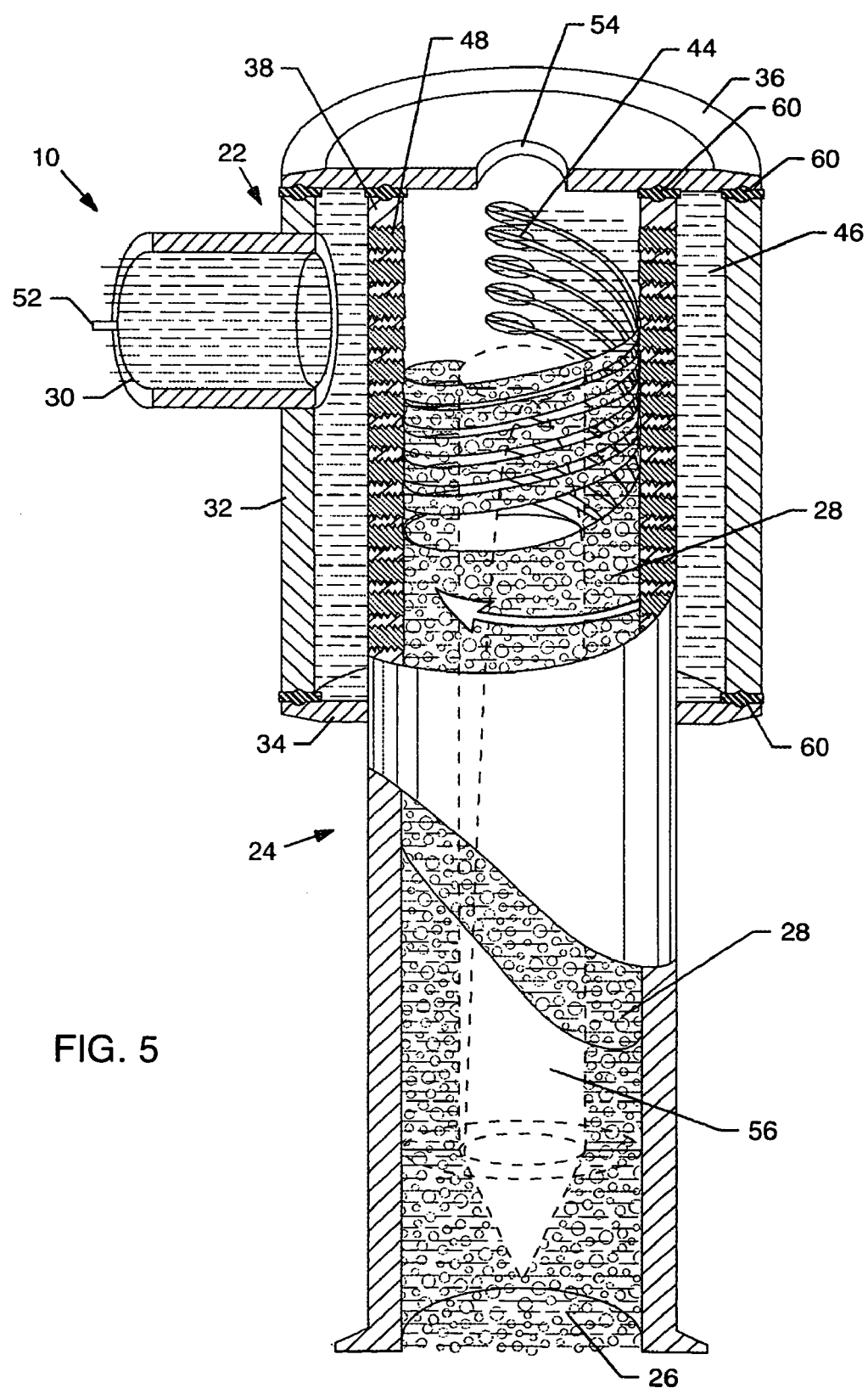
FIG. 5 is a partially sectioned view of a mixing apparatus used in accordance with the present invention.
Figure 6:
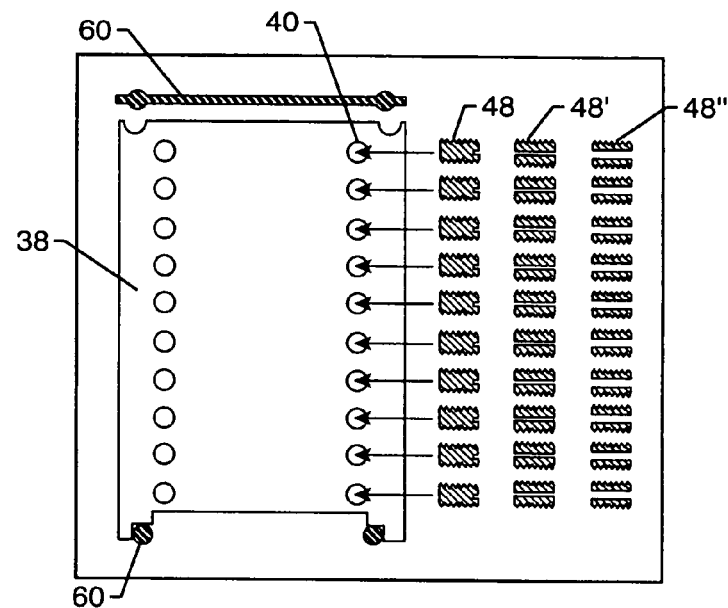
FIG. 6 is a diagrammatic view of a cartridge of the mixing apparatus of the present invention, illustrating the insertion of fluid restriction plugs.
Figure 7:
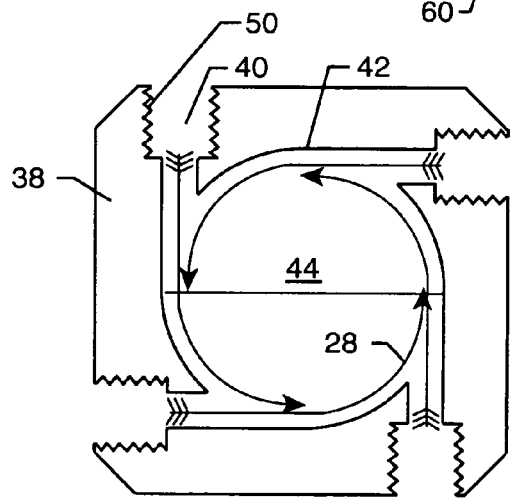
FIG. 7 is a top cross-sectional view illustrating tangential ports formed in the cartridge of the mixing apparatus.
Figure 8:
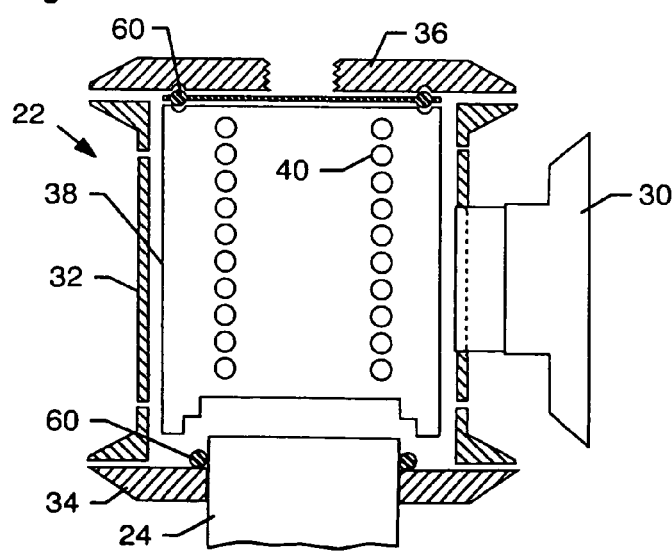
FIG. 8 is a cross-sectional diagrammatic view of component parts of the mixing apparatus of FIG. 5.

The cartridge 38 is in fluid communication with the down tube 24. The cartridge 38 includes a plurality of ports 40 that extend through the wall of the cartridge block 38. The ports 40 are configured such that the liquid is directed at a generally tangential direction to an inner surface 42 of the cartridge 38 so as to have imparted thereto a spinning motion to form a vortex within the cartridge 38 and down tube 24, as illustrated in FIG. 5. Although the cartridge 38 is illustrated in FIGS. 5, 6 and 8 as being cylindrical, more typically the cartridge block 38 is multi-faceted, as illustrated in FIG. 7. The cartridge block 38 can be configured as a hexagon, octagon, or any other multi-faceted structure. The ports 40 are formed in at least one facet thereof, and more typically in every facet thereof, as illustrated in FIG. 7. The alignment of the port pathways 40 from facet to facet can be uniform or staggered to minimize the ridges in the center spinning cyclonic chamber 44 of the cartridge block 38.

Thus, contaminated liquid flows into the reactor head 22 through inlet 30 and into a receiving chamber 46 defined by the space between the cartridge block 38 and the plenum 32, base 34, and lid 36. As the flow of liquid fills the receiving chamber 46, the liquid is directed through open port 40 in a tangential manner to create the spinning liquid, as previously discussed above and illustrated in FIG. 5. The number of open ports 40, the diameter of the ports 40 and the diameter of the inner wall 42 or cyclonic chamber 44 and the down tube 24, which are typically substantially equal in dimension, determine the speed at which the liquid spins and passes through the apparatus 10.

The diameter of the central cyclonic spin chamber, defined by the inner walls of the cartridge block 38 and down tube 24, is determined by the flow the apparatus 10 is likely to be exposed to. Although there is a wide range of flows that a given diameter apparatus 10 can properly handle, when that flow range is exceeded, the apparatus 10 will require replacement by a larger or smaller diameter chamber. For example, the cyclonic chamber with a diameter of one inch can handle between 0.1 to 10 gallon per minute flow. A two inch diameter cyclonic chamber can handle between 5 and 80 gallon per minute flow. A three inch cyclonic chamber diameter can handle flows between 70 to 250 gallons per minute. A six inch diameter cyclonic chamber can handle flows between 500 to 2000 gallons per minute. It should be noted that the upper range of these flow rates are not limited by the cyclone chamber, but by the cost of the pumping system required to deliver the flow, the pressure requirement for the given process stream and the size of the downstream flotation device for processing and separating the resultant liquid/solid components.

Another particular unique aspect of the present invention is that the ports 40 are adapted to receive removable restrictor plugs 48. Typically, the ports are drilled and tapped so as to include threads 50 which allow the threaded restrictor plugs 48 to be threaded therein with a screw driver or other tool. Of course, other means can be utilized to removably insert the restrictor plugs 48 within the ports 40 as will be appreciated by those skilled in the art. By inserting or removing these plugs 48 at a given constant flow rate, the energy imparted to the spinning fluid 28 is increased or decreased. This effects the volume of liquid flowing through the apparatus 22 as well as the change in pressure of the fluid through the apparatus 10.

As described above, in the prior art, those skilled in the art claim that longer mixing time (1–10 minutes) at low mixing energy (30–100 RPM of a mechanical mixer) is needed for optimum flocculation and mixing. The inventors have discovered that this is not necessarily the case in that shorter mixing times (5–10 seconds) with high mixing energies (up to 4000 RPM with a mechanical mixer) yielded cleaner water with lower turbidity and larger floccs which are easier to float. Thus, the centrifugal mixing inside the apparatus 10 may only last a few seconds but yield excellent mixing and floccs without any mechanical premixing or potential polymer breakage. The mixing energy or speed at which the liquid 28 is passed through the apparatus 10 is determined in large part by the number of ports 40 which are opened to receive liquid. The fewer open ports 40, the higher the velocity of the spinning liquid 28.

With reference now to FIG. 6, the mixing apparatus 10 of the present invention can be further adjusted by providing restrictor plugs 48' and 48'' which have apertures holes through the center thereof to permit a small amount of liquid to pass therethrough. The diameter of such small aperture holes through the plugs 48 can vary such that a large number of plugs 48 are available to the end user to adjust the mixing apparatus 10. By modifying the size of the aperture holes in the plugs 48, another degree of control over the pressure drop/acceleration of the liquid 28 can be achieved while expanding the useful flow range of a given apparatus 10 with a fixed diameter cyclonic chamber.

Figure 9:
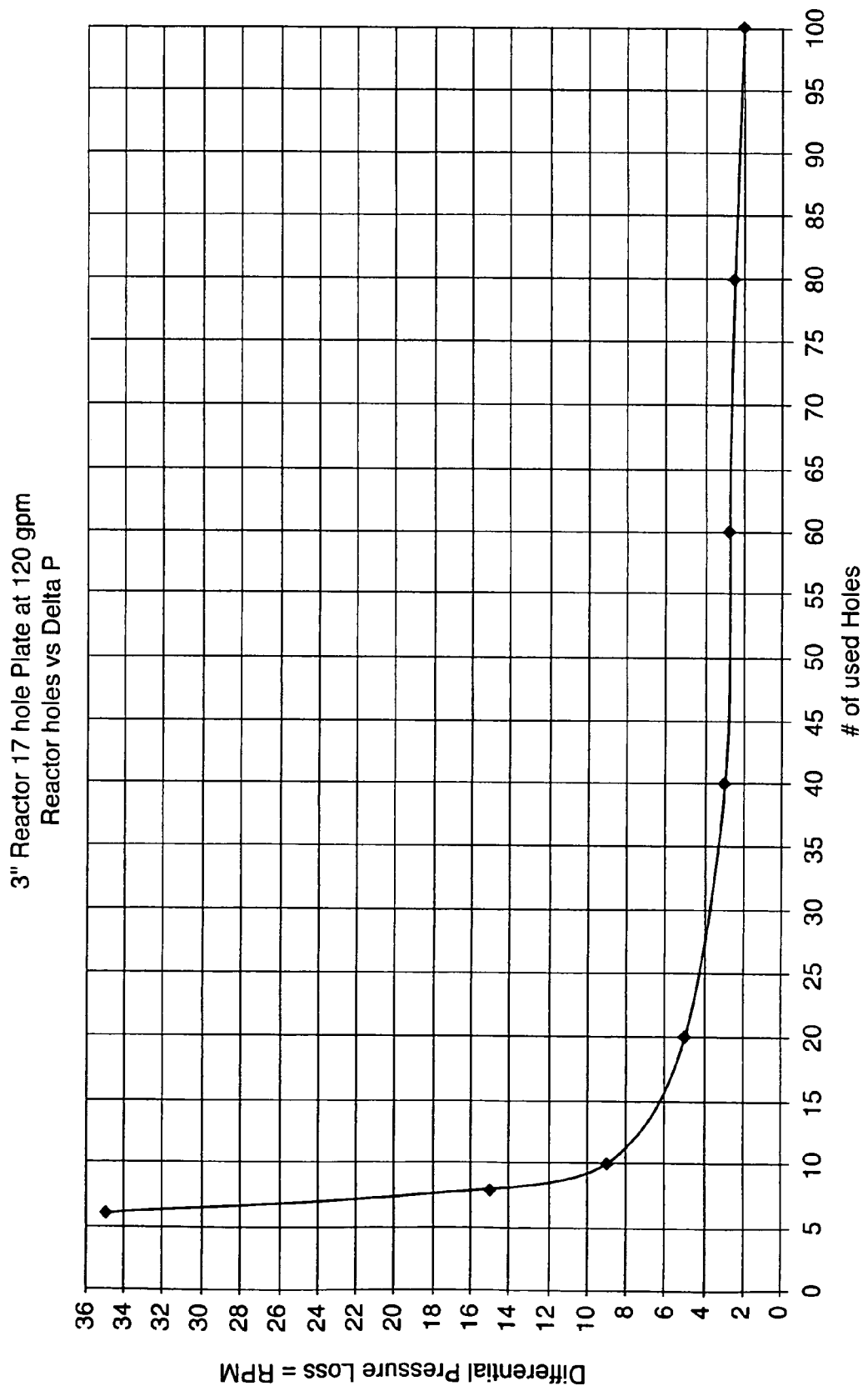
FIG. 9 is a graph depicting the optimum number of open holes or ports in the cartridge for given parameters to treat the liquid.

With reference to FIG. 9, a graph is shown which illustrates the pressure loss differential, which corresponds to the velocity or rpm of the spinning fluid, as compared to the number of open ports 40 in the reactor head 22. It will be seen that the initial altering of the number of open ports dramatically affects the pressure differential loss. However, as more ports are opened, the pressure differential decreases. This can be advantageously used to effect the mixing energy and time. For example, if a certain chemical requires a relatively high mixing energy, the number of ports 40 or holes in the cartridge of the reactor head 22 which are open are but a few. However, if the chemistry is susceptible to breakage or otherwise requires a lower mixing energy, the number of open ports or holes 40 is increased so as to reduce the velocity and pressure differential in the mixing apparatus 10.

Additives, such as pH chemistry, flocculants, coagulants, etc. are typically added to the contaminated stream to alter the chemistry thereof and bind up the suspended solids in the liquid stream 28. Although this can be done upstream of the apparatus 10, the apparatus 10 of the present invention can also include inlets 52 for introducing such additives immediately before or during mixing. A gas inlet 54 is also formed in the apparatus 10, typically in the reactor head. Preferably, the gas injection port 54 is formed in the lid 36 of the reactor head 22 such that the gas introduced therethrough is fed into a central evacuated area 56 such that the spinning liquid absorbs and entrains the gas that is introduced into the apparatus 10. The lower pressure vortex cavity 56 causes the introduced gas to come into contact with the centrally rotating liquid as it spins into the down tube 24 of the apparatus 10. The gas may be continuously or intermittently added through the injection port 54. A sensor 58 may be used to sense where the central gas column 56 terminates, the physical shape of the vortex being manipulated by adding more or less gas to the central vortex 56. Such a sensor may visually, sonically, electronically, or otherwise sense the location of the vortex to determine the amount of replenishment gas to replace the gas that gets absorbed into the liquid 28 and carried downstream.

With reference now to FIGS. 5 and 8, in a particularly preferred embodiment, the reactor head 22 is modular in nature such that the lid 36 can be removed from the base plenum 32 for access to the central cartridge 38 and the restrictor plugs 48 and ports 40 thereof. Typically, a quick release clamp (not shown) holds the removable lid 36 to the plenum 32, although other means may be used such as threaded attachments, etc. Gaskets 60 are typically used to seal the lid 36 to the cartridge 38 and plenum 32. With the removable lid 36, the center cartridge 38 can be easily accessed for adjustment. The cartridge 38 can be easily pulled up out of the pressure chamber of the reactor head 22 for the addition of more plugs 48, or the replacement of solid plugs 48 with drilled aperture plugs 48', or for the removal of large chunks of material or thin films of mineral build-up that might accumulate in either the pathways 40 or cyclonic chamber 44. An item of great importance to the operator of the apparatus 10 is that any liquid 28 that is present inside the reactor head 22 during one of these adjustments falls back into the pressure chamber/cyclonic chamber when the center cartridge is lifted out, leaving the floors free of spills.

Thus, as the contaminated liquid source changes, the mixing apparatus 10 of the present invention can be altered to properly mix in the additives and gas as are determined necessary. As discussed above, opening or closing some of the ports 40, as well as lowering or increasing the inlet pressure can manage the magnitude of mixing forces. Most contaminants, and their corresponding charge satisfaction additives, have been found to have a mixing energy "sweet spot" where flocculation performance is enhanced. Tuning the mixing energy is a significant, but up to now overlooked, component of flotation system design and mixing methodologies.

Figure 10:
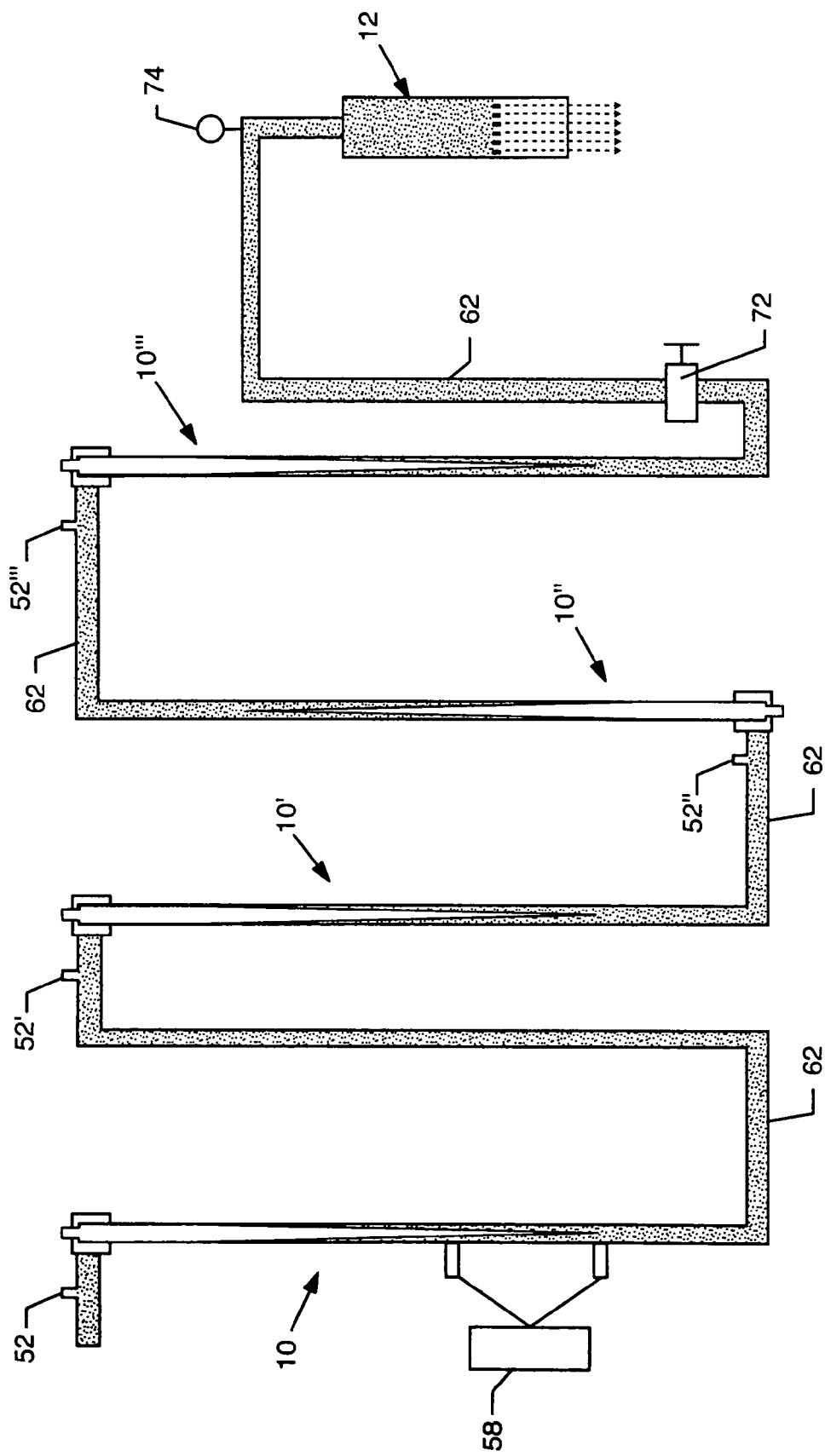
FIG. 10 is a diagrammatic view of multiple mixing apparatuses of the present invention joined in series to a pressure reducing device, in accordance with the present invention.

As few as a single mixing apparatus 10 or multiple mixing apparatuses 10–10''' in fluid connection series, as shown in FIG. 10, may be utilized depending upon the amount of mixing energy and time required to optimize the separation. Connecting in series a plurality of mixing apparatuses 10 allows sequential injection of chemicals at optimum mixing energy and time for each chemical constituent individually, and multiple gas dissolving vortex exposures if the energy to optimize the gas-mixing vortex is not sufficient to saturate the stream as a result of soft chemical mixing energy requirements or the like. As will be appreciated by one skilled in the art, tubing 62 interconnects the outlet 26 and inlet 30 of each apparatus 10. It will be appreciated by those skilled in the art that the adjustable mixing apparatus 10 of the present invention enables the end user to add a high mixing energy into one mixing apparatus 10, which has a relatively small number of ports 40 open so as to impart a high velocity to the contaminated liquid to highly and forcefully mix the liquid and a chemical additive, and then inject another chemical for a second mixing apparatus which has a softer chemical mixing energy requirement and the mixing apparatus 10 has a relatively large number of ports 40 open so as to impart a relatively slow rpm and lower mixing energy. Similarly, instead of utilizing a long down tube, a plurality of mixing apparatuses 10 can be joined in series to prolong the mixing time.

With reference now to FIGS. 10–2, the substantially homogeneously mixed stream is then directed from the one or more mixing apparatuses 10 to a pressure reducing device 12, referred to herein as a nucleation chamber. In a particularly preferred embodiment, the nucleation chamber comprises a hollow tube 64 having a cavitation plate 66 disposed therein. The cavitation plate has a plurality of apertures 68 of a predetermined number and size through which the liquid must pass. The design of the flow restriction plate 66 ensures that the nucleating bubbles will begin forming at a size that is small enough to create long range hydrophobic forces, promoting bubble/particle attachment. The nucleation chamber 12 of the present invention is designed to create the optimum size and number of bubbles in a corresponding mixing environment which may be unique to each stream.

Figure 13:
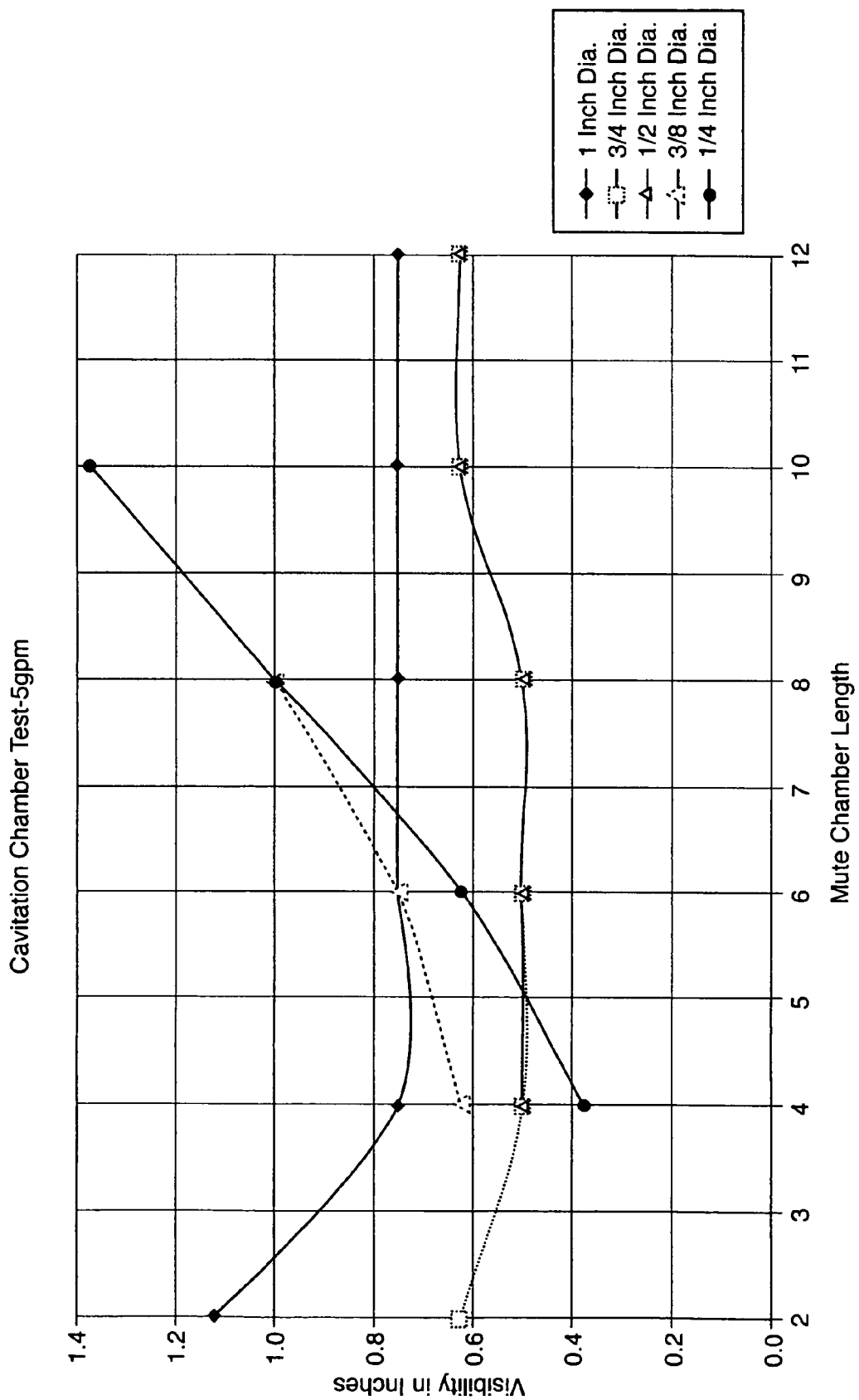
FIG. 13 is a graph depicting the determination of the optimal length and diameter of the pressure reducing device of the present invention.
Figure 14:
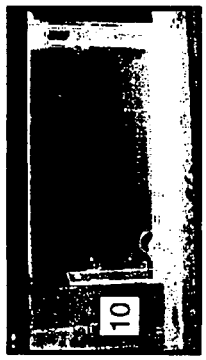
FIG. 14 are various depictions of bubbles created in a flotation tank in relation to liquid flow or pressure.
Figure 14:
Figure 14:
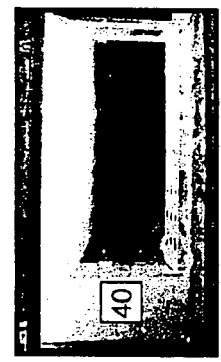
Figure 14:
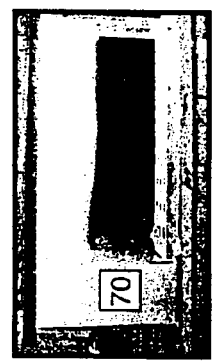
Figure 14:
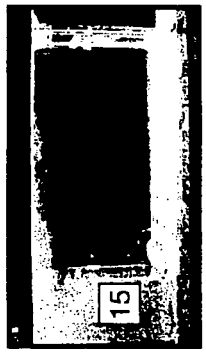
Figure 14:
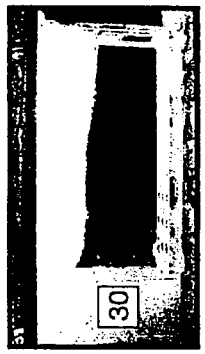
Figure 14:
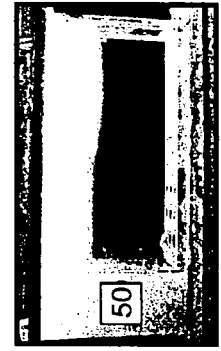
Figure 14:
Figure 14:
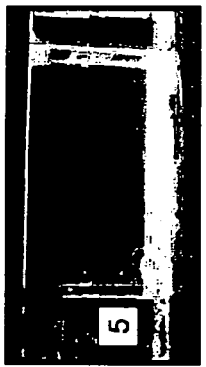
Figure 14:
Figure 14:
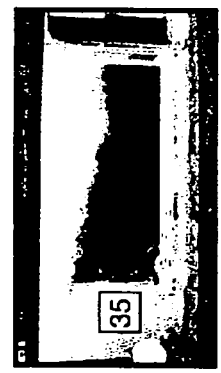
Figure 14:
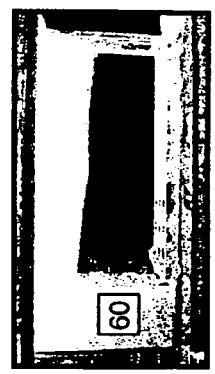

With reference now to FIG. 13, the end user will have a maximum contaminated stream flow, expressed in gallons per minute, for their particular application. The pressure reducing nucleation chamber 12 can be optimized in size so as to create the greatest number of bubbles. As illustrated in FIG. 13, for a given flow, there are optimum chamber diameters and lengths. The "visibility in inches" portion of the graph in FIG. 13 refers to the visibility in the flotation tank 14. With reference to FIG. 14, which illustrates a series of photographs taken at different flows or pressures (5–80), when relatively no bubbles are present at the upper portion of the flotation tank 14, visibility is very high, as illustrated in flow "5". However, as the number of bubbles is increased due to the optimization of the pressure reducing device 12 parameters and mixing apparatus 10 parameters, the upper portion of the flotation tank 14 becomes increasingly filled with bubbles, shown as white in FIG. 14. Ideally, the visibility is less than one inch and is generally consistent along the length of the tank, as shown in flows "40–70". This represents a relatively large number of bubbles which can adhere to the suspended particles and chemistry of the stream for their removal. Thus, typically, the nucleation chamber tube 64 length and diameter are selected so as to reduce the visibility in inches of the liquid in the flotation tank 14.

With reference again to FIG. 1, the nucleation chamber 12 is disposed within a bloom chamber 70 of the flotation tank 14, where the contaminated liquid mixture is forced through the aperture 68 of the cavitation plate 66 and depressurized and floats to the surface as the nucleated bubbles enlarge in size due to the depressurization and coalescing with other bubbles.

Figure 15:
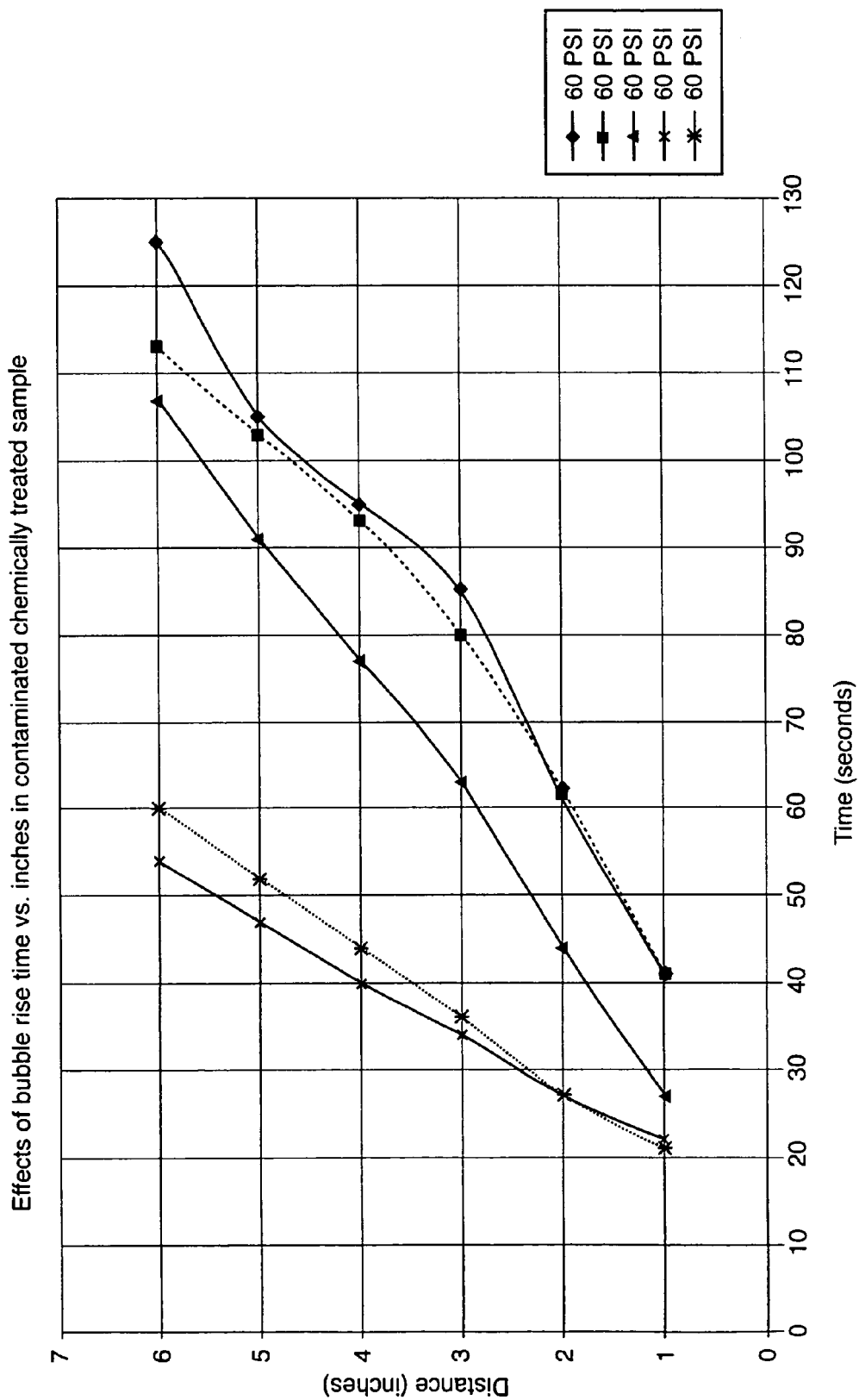
FIG. 15 is a graph depicting the residence time of bubbles for given liquid pressures.

With reference now to FIG. 15, a graph illustrates the time in seconds that it takes an exiting bubble to rise a given distance in inches. It will be seen that if the pressure of the liquid at the cavitation plate 66 is between twenty and thirty psi, the time for the bubbles to rise five inches is approximately twenty to thirty seconds. However, if the pressure is increased to say 50–60 psi, the time taken to rise five inches is over one minute. This is referred to as "residence time" in the art. Typically, increased residence time is desirable as the bubbles are able to adhere addition floccs and particles onto them the longer that they reside within the liquid before floating to the surface. Twenty or thirty seconds of residence time may not optimize the removal of the particulates from the liquid. However, residence times of current systems which are between 45 minutes and one hour do not enable the near real-time adjustments necessary to adequately process changing liquid streams. Due to the configuration and design of the present invention, residence times of between 1–2 minutes satisfactorily remove the contaminants from the liquid.

Figure 11:
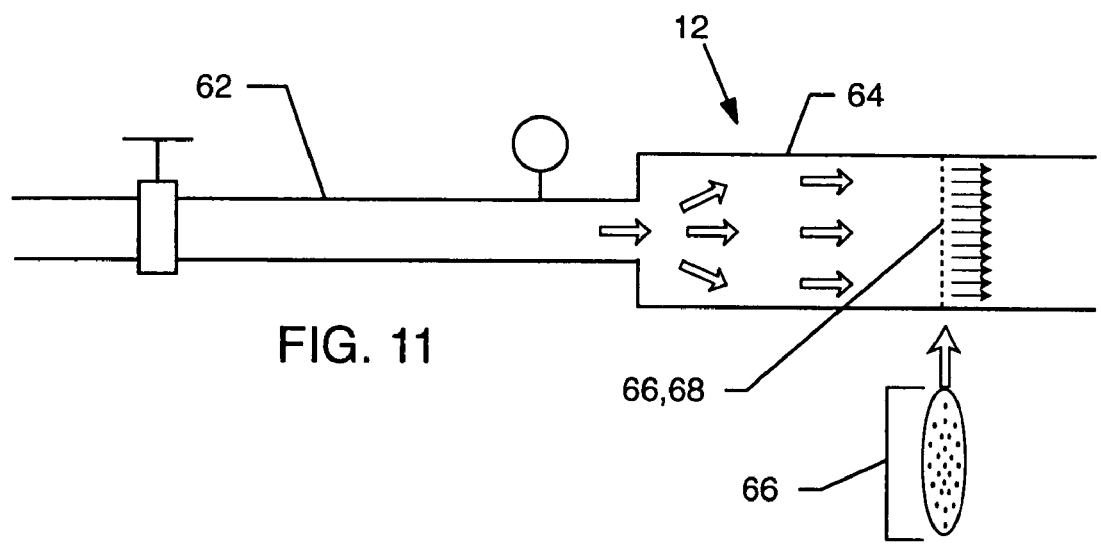
FIG. 11 is a diagrammatic view of a segment of the fluid line, illustrating a fluid valve, pressure sensor and pressure reducing device used in accordance with the present invention.
Figure 12:
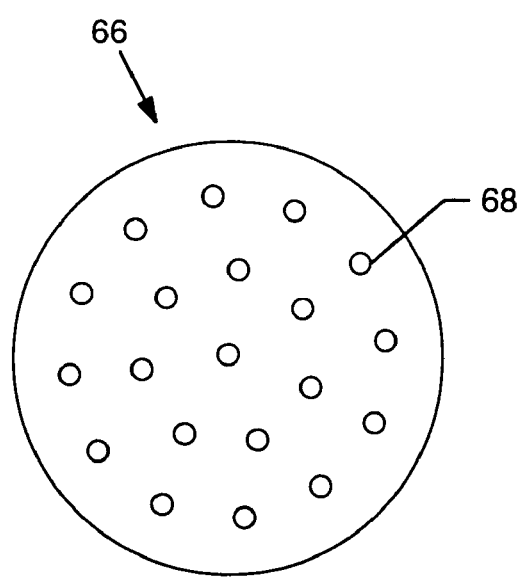
FIG. 12 is a top plan view of an apertured plate used in accordance with the present invention.

Referring again to FIGS. 10 and 11, the pressure P2 at the cavitation plate 66 can be adjusted in a variety of ways, such as changing the impeller size of the pump, increasing the pump rotational speed, or installing a valve 72 and a pressure sensor 74 to control the flow and pressure at the cavitation plate 66 so as to optimize it.

With reference now to FIGS. 16A–16C, charts are provided which illustrate the number of apertures 68 within the cavitation plate 66, the size of the apertures in sixty-fourths of an inch, the pump Hz, the relatively constant flow in gpm, and the resulting change in pressure and visibility at a spot two horizontal feet into a separation chamber 76 portion of the flotation tank 14. Thus, a review of FIG. 16A will reveal that the optimum size of the aperture 68 of the cavitation plate 16 is 18/64, which yields the lowest visibility of 1.50 inches. A review of FIGS. 16A–16C will also reveal that a fewer number of holes is desirable to increase the number of bubbles and thus reduce the visibility for the given flow.

Figure 17:
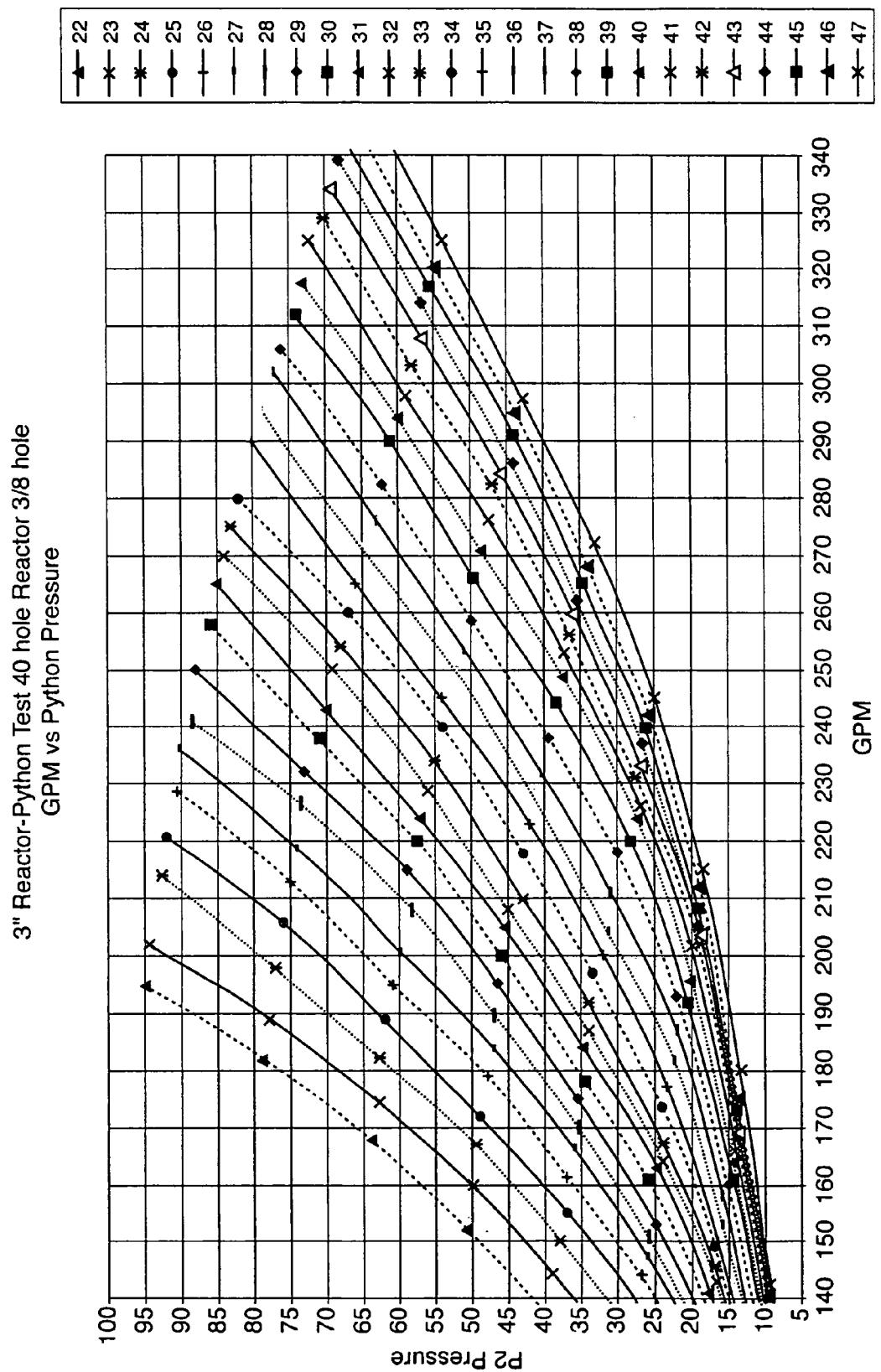
FIG. 17 is a graph depicting optimal number of apertures in the apertured plate of FIG. 12 for a given flow and liquid pressure.

With reference now to FIG. 17, graphs can be created which demonstrate the necessary number of holes or apertures 68 in the cavitation plate 66 for the contaminated stream flow in gallons per minute as to the desired P2 cavitation plate liquid pressure. It has been found that an optimal P2 pressure is between 50 and 60. Thus, once the flow of the end user is determined, this graph could be utilized to determine the optimal configuration of the cavitation plate 66.

Figure 18:
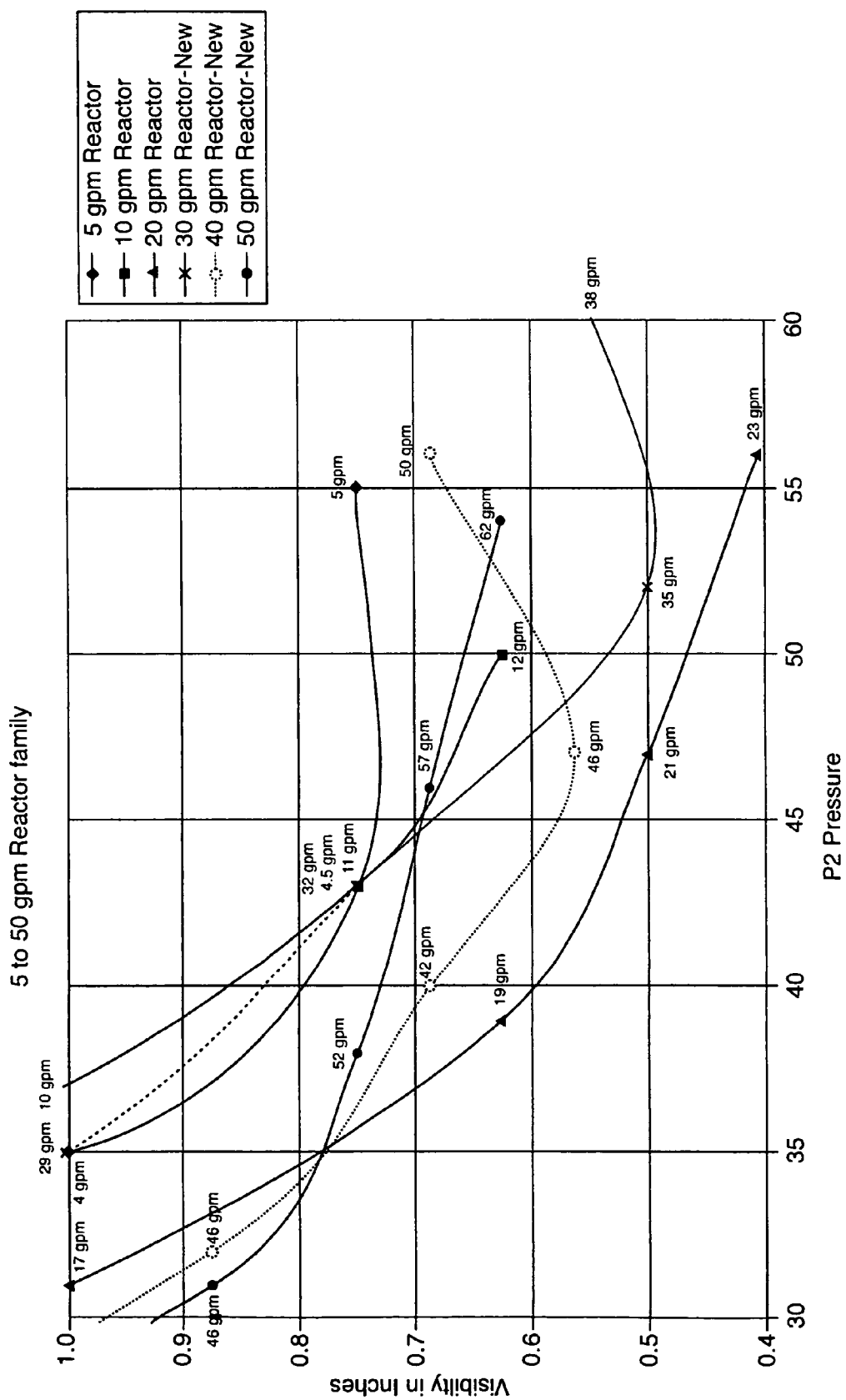
FIG. 18 is a graph depicting the optimal determination of characteristics of the pressure device and mixing apparatus, in accordance with the present invention.

With reference now to FIG. 18, it will be appreciated by those skilled in the art that it is the fine tuning and consideration of both the adjustable factors of the mixing apparatus 10 as well as the nucleation chamber 12 which can be matched to optimize the number and size of bubbles emitted into the flotation tank 14. Thus, the flow through the mixing apparatus 10, as well as the velocity of the liquid therethrough, can be altered and taken into account by the size of the nucleation chamber tube 64 and the size and number of apertures 68 in the cavitation plate 66 to optimize bubble formation (reduction of visibility) in the flotation tank 14.

With reference again to FIG. 1, once the mixed liquid exits the nucleation chamber 12 in the bloom chamber 70, the bubbles begin to enlarge in size and rise towards the upper portion of the flotation tank 14. However, as shown previously, not all of the bubbles will immediately rise to the surface of the liquid within the flotation tank 14. Instead, some of the bubbles will take longer to fully enlarge and rise. Coalescing of bubbles will speed up the flotation of some bubbles. As discussed above, a certain level or residence time is desirable to optimize the flotation of the particles from the liquid. A wall 78 separates the bloom chamber 70 from the separation chamber 76 of the flotation tank 14. This results in a circulation of bubbles and floccs in the upper portion of the flotation tank 14. The reference number 16 represents the fully floated bubble particles, which are sometimes referred to as "froth", which collect at the surface of the liquid. However, the continual input of new liquid from the nucleation chamber 12 creates an eddy in the upper portion of the flotation tank wherein the bubbles enlarge and coalesce over time and attract and adhere particles and chemistry to create floccs which eventually reach the surface, typically within a minute or two of time. The wall 78 includes an adjustable weir 80 to control to a certain degree the current flow at the top portion of the flotation tank 14, and also to control the amount of liquid which circulates into the bloom chamber 70 and is consequently recharged somewhat with new bubble/liquid.

As the water is decontaminated and the bubble/particles are floated upwardly to the surface of the liquid of the flotation tank 14, the denser decontaminated liquid 18 sinks towards the bottom of the flotation tank 14. In a particularly preferred embodiment, the flotation tank 14 includes a restrictive false bottom 82 having apertures or flow ports 84 through which the decontaminated liquid 18 sinks. The false bottom 82 balances the flow across the entire bottom of the tank 14 before the decontaminated liquid enters an exit chamber 86. An adjustable wall 88 is disposed within the exit chamber 86 to control the volume of decontaminated liquid 18 removed from the flotation tank 14 and received through outlet 90. In this way, the liquid height in the flotation tank 14 can be adjusted.

The buoyant froth sledge 16 at the top surface of the flotation tank 14 is removed into the dewatering apparatus 20. Typically, this is done via a skimming device 92 wherein a plurality of paddles are used to push the flocc froth 16 up a ramp 94 and into a receiving portion 96 of the dewatering apparatus 20. The solids dewatering device 20 uses the excess residual dissolved gas in the water, which is trapped in the flocc, to coalesce with the nanobubbles trapped in the floccs 16, thus forcing the residual liquid from the flocc froth 16. The skimmer device paddles 92 remove the floated floccs 16 at an optimum rate for particular streams. Since the flocc 16 is only minutes old, the entrained gas in the water/flocc is still degassing, and a portion of this entrained gas coalesces with the bubbles trapped in the flocc. As a result, these bubbles expand, but stay trapped inside the flocc. This expansion drives out an equal volume of water from the flocc matrix, which reduces the water content of the sludge 16, resulting in drier, more buoyant froth.

With reference now to FIG. 13, the solids dewatering receiving device 20 includes a receiving chamber 96 defined by a sloped wall 98. The receiving chamber wall 98 is adjusted to impede the discharge of the sludge or froth 16 into the water collection area 100. The draining water or liquid sinks to the bottom of the liquid collection area 100. Periodically, the weight of the fresh flocc 16 pushes the older flocc 16 through the bottom of wall 98 so that it floats on top of the liquid in area 100. The new flocc floats on top of the residual liquid until it falls into a removal tank 102. Periodically, the dewatered liquid is removed through an outlet 104, which may be coupled with a pump or the like. As shown in FIGS. 14 and 15, a paddle wheel 106 or a skimmer 108 may be implemented to force the dewatered flocc 16 into the collection chamber 102. A sensing device 110 having an upper level sensor 112 and a lower level sensor 114 is typically connected to a pump 116 such that as the dewatered sludge 16 reaches a certain elevation within the collection bin 102, the pump 116 is activated to remove the sludge for disposal or further processing. The pump 116 can be automatically shut off when the lower sensor 114 indicates that the level sludge 16 within the collection chamber 102 has reached a relatively low level.

It will be appreciated by those skilled in the art that the system of the present invention provides many advantages over currently used flotation decontamination systems. The system components can have certain structural members and characteristics which are selected and can be controlled to optimize the creation of bubbles within the flotation tank 14. Moreover, due to the relatively sort residence time of the saturated bubble/liquid in a flotation tank 14, near real-time adjustments can be made to the flow, pressure, mixing speed, etc. of the system to meet the changing needs of the contaminant stream in near real-time. The interaction of the bloom chamber 70 and separation chamber 76 of the flotation tank 14 enable the flotation tank 14 to have a very small footprint (up to 10% of traditional footprints). Unlike conventional DAF systems, substantially complete and homogeneous mixture by the mixing apparatus 10 results in a 100% discharge through the pressure reducing device 12 into the flotation tank 14, thus treating the entire contaminated stream flow instead of only a portion at a time. Other advantages and benefits of the present invention will be readily apparent to those skilled in the art.

Although several embodiments have been described in detail for purposes of illustration, various modifications may be made without departing from the scope and spirit of the invention. Accordingly, the invention is not to be limited, except as by the appended claims.

What is claimed is:

1. A system for separating particles from a contaminated liquid stream by flotation, comprising:
   an apparatus for mixing the liquid with a separation enhancement additive and a gas, wherein the mixing apparatus comprises a reactor head having a gas injection port and a plurality of liquid ports configured to impart a spinning motion to the liquid as it passes to a downtube of the mixing apparatus, and wherein the liquid ports are configured to removably receive liquid flow restrictors, wherein the velocity and volume of the liquid passing through the mixing appartus can be altered;

a pressure reducing device in fluid communication with an outlet of the mixing apparatus for creating bubble laden floccs in the liquid;

a flotation tank having a bloom chamber and a separation chamber, the bloom chamber in fluid communication with an outlet of the pressure reducing device, the flotation tank being configured to direct the bubble laden floccs upwardly within the bloom chamber to an upper portion of the flotation tank and circulate the bubble laden floccs within the upper portion of the flotation tank until they rise to an upper surface of the flotation tank, and wherein the decontaminated liquid flows to a lower portion of the separation chamber of the flotation tank; and a mechanism for removing the floated contaminate floccs from the upper surface of the flotation tank.

2. The system of claim 1, including a pressure sensor operably disposed between the mixing apparatus and the pressure reducing device.

3. The system of claim 2, including an adjustable valve disposed between the mixing apparatus and the pressure reducing device for altering the flow of liquid to the pressure reducing device.

4. The system of claim 1, wherein the removing mechanism comprises a skimmer.

5. The system of claim 1, including a dewatering apparatus disposed relative to the flotation tank to receive and dewater removed contaminated floccs.

6. The system of claim 1, wherein the pressure reducing device comprises an enlarged tube having a flow restrictor element therein.

7. The system of claim 6, wherein the flow restrictor element comprises an apertured plate.

8. The system of claim 7, wherein the size and the number of apertures in the plate are selected according to a predetermination of characteristics of the contaminated liquid.

9. The system of claim 1, including an adjustable wall disposed between the bloom chamber and separation chamber of the flotation tank.

10. The system of claim 1, including an apertured wall disposed within the separation chamber of the flotation tank above a floor thereof.

11. The system of claim 1, including a decontaminated liquid outlet formed in a lower portion of the flotation tank.

12. The system of claim 11, including a decontaminated liquid chamber in fluid communication with the lower portion of the flotation tank and the decontaminated liquid outlet and including an adjustable wall for selectively controlling the volume of decontaminated liquid removed through the outlet.

13. A system for separating particles from a contaminated liquid stream by flotation, comprising:

an apparatus for mixing the liquid with a separation enhancement additive and a gas, wherein the mixing apparatus comprises a reactor head having a gas injection port and a plurality of liquid ports configured to impart a spinning motion to the liquid as it passes to a downtube of the mixing apparatus, and wherein the liquid ports are configured to removably receive liquid flow restrictors, wherein the velocity and volume of the liquid passing through the mixing apparatus can be altered;

a pressure reducing device comprising an enlarged tube having a flow restrictor element therein, the device being in fluid communication with an outlet of the mixing apparatus for creating bubble laden floccs in the liquid;

a flotation tank having a bloom chamber and a separation chamber, the bloom chamber in fluid communication with an outlet of the pressure reducing device, the flotation tank being configured to direct the bubble laden floccs upwardly within the bloom chamber to an upper portion of the flotation tank and circulate the bubble laden floccs within the upper portion of the flotation tank until they rise to an upper surface of the flotation tank, and wherein the decontaminated liquid flows to a lower portion of the separation chamber of the flotation tank;

a decontaminated liquid outlet formed in a lower portion of the separation chamber;

a skimmer for removing the floated contaminate floccs from the upper surface of the flotation tank; and a dewatering apparatus disposed relative to the flotation tank to receive the floated contaminate floccs from the skimmer and configured to dewater the removed contaminated floccs.

14. The system of claim 13, including a pressure sensor operably disposed between the mixing apparatus and the pressure reducing device.

15. The system of claim 14, including an adjustable valve disposed between the mixing apparatus and the pressure reducing device for altering the flow of liquid to the pressure reducing device.

16. The system of claim 13, wherein the flow restrictor element comprises an apertured plate, the size and the number of apertures in the plate being selected according to a predetermination of characteristics of the contaminated liquid.

17. The system of claim 13, including an adjustable wall disposed between the bloom chamber and separation chamber of the flotation tank.

18. The system of claim 13, including an apertured wall disposed within the separation chamber of the flotation tank above a floor thereof.

19. The system of claim 13, including a decontaminated liquid chamber in fluid communication with the lower portion of the flotation tank and the decontaminated liquid outlet and including an adjustable wall for selectively controlling the volume of decontaminated liquid removed through the outlet.

20. A system for separating particles from a contaminated liquid stream by flotation, comprising:

an apparatus for mixing the liquid with a separation enhancement additive and a gas, wherein the mixing apparatus comprises a reactor head having a gas injection port and a plurality of liquid ports configured to impart a spinning motion to the liquid as it passes to a downtube of the mixing apparatus, and wherein the liquid ports are configured to removably receive liquid flow restrictors, wherein the velocity and volume of the liquid passing through the mixing apparatus can be altered;

a pressure reducing device in fluid communication with an outlet of the mixing apparatus for creating bubble laden floccs in the liquid, the device comprising an enlarged tube having an apertured plate therein, the size and number of the apertures in the plate selected according to a predetermination of characteristics of the contaminated liquid;

a pressure sensor operably disposed between the pressure reducing device and the mixing apparatus;

an adjustable valve disposed between the pressure reducing device of the mixing apparatus for altering the flow of liquid to the pressure reducing device;

a flotation tank having a bloom chamber and a separation chamber separated by an adjustable wall, the bloom chamber in fluid communication with an outlet of the pressure reducing device, the flotation tank being configured to direct the bubble laden floccs upwardly within the bloom chamber to an upper portion of the flotation tank and circulate the bubble laden floccs within the upper portion of the flotation tank until they rise to an upper surface of the flotation tank, and wherein the decontaminated liquid flows to a lower portion of the separation chamber of the flotation tank;

a decontaminated liquid outlet formed in a lower portion of the separation chamber;

a skimmer for removing the floated contaminate floccs from the upper surface of the flotation tank; and a dewatering apparatus disposed relative to the flotation tank to receive the floated contaminate floccs from the skimmer and configured to dewater the removed contaminated floccs.

21. The system of claim 20, including an apertured wall disposed within the separation chamber of the flotation tank above a floor thereof.

22. The system of claim 20, including a decontaminated liquid chamber in fluid communication with the lower portion of the flotation tank and the decontaminated liquid outlet and including an adjustable wall for selectively controlling the volume of decontaminated liquid removed through the outlet.

* * * * *